Dec. 4, 1945.   E. MEZ ET AL   2,390,163
TYPEWRITING ACCOUNTING MACHINE
Filed June 22, 1936   12 Sheets-Sheet 2
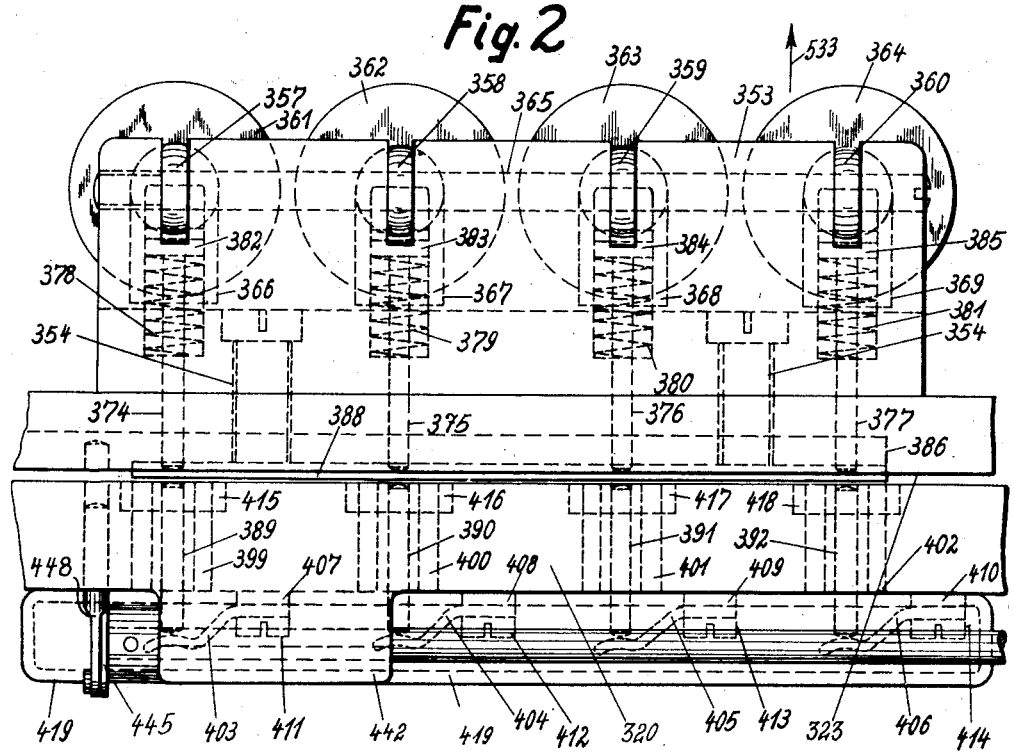
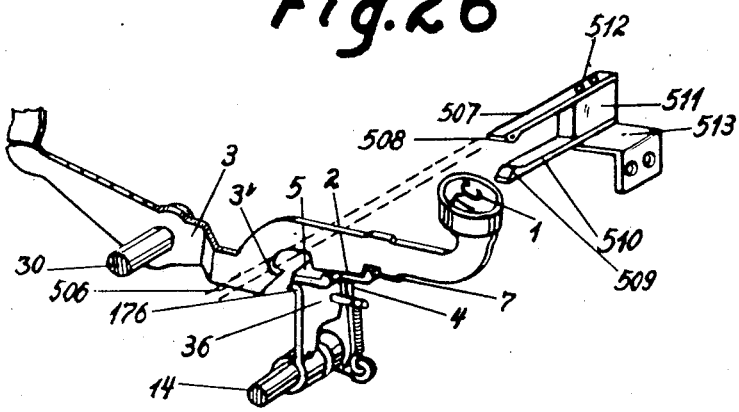
Inventors:
E. MEZ
F. POTT
and W. HEINZE
Attorney

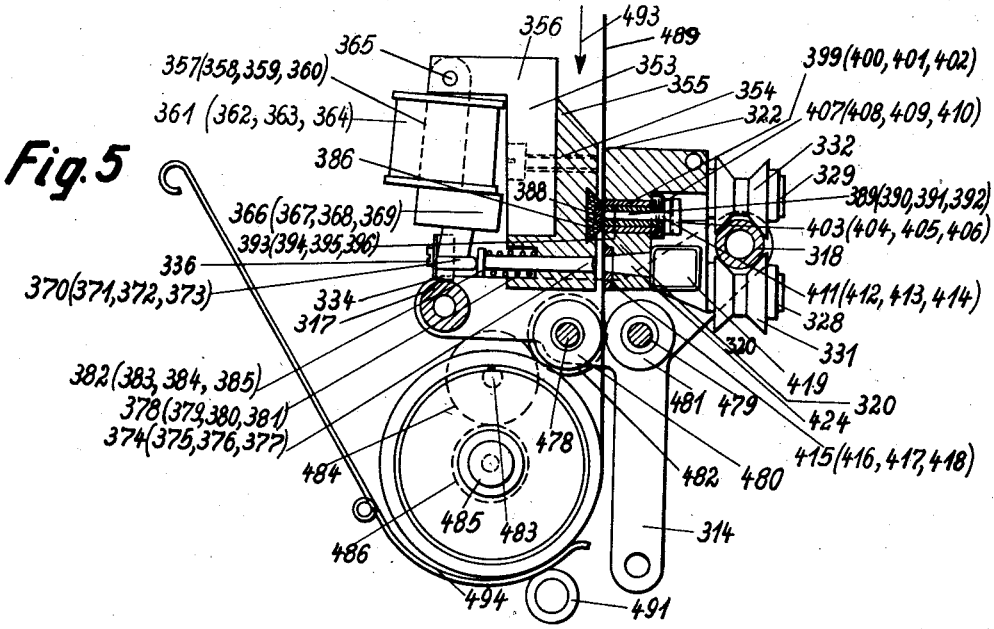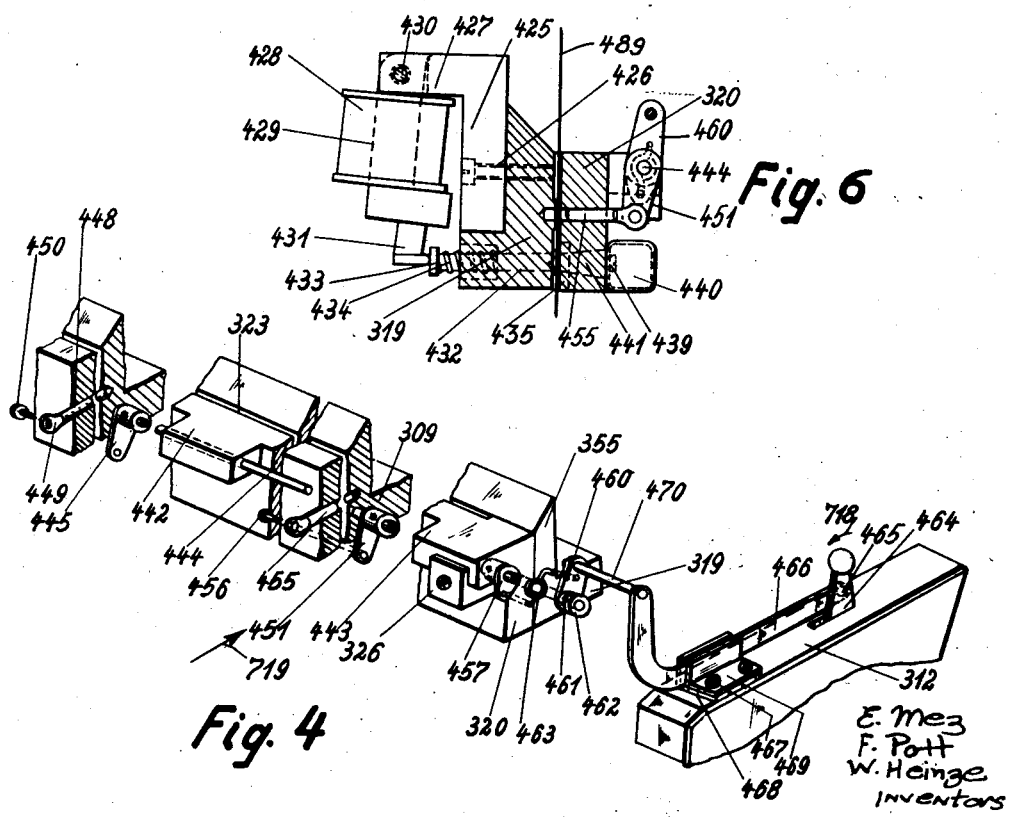

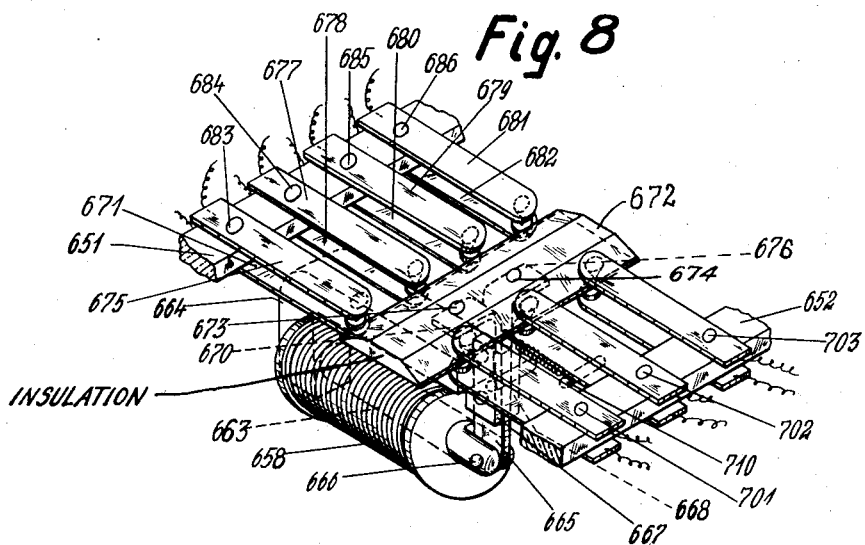
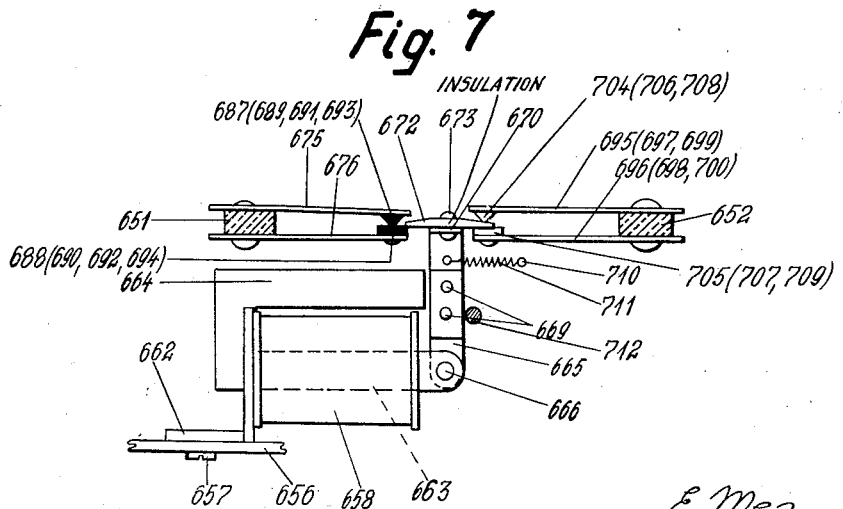

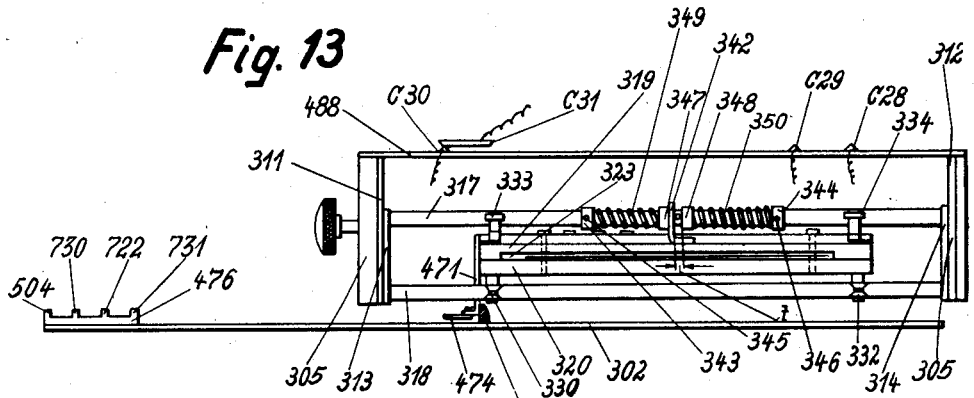
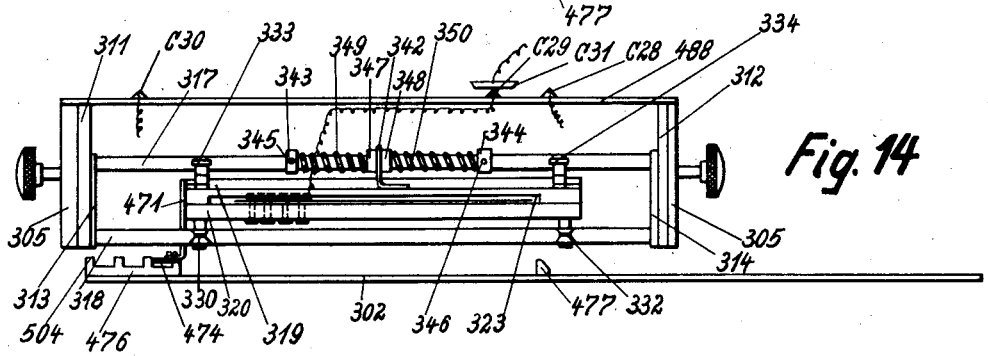
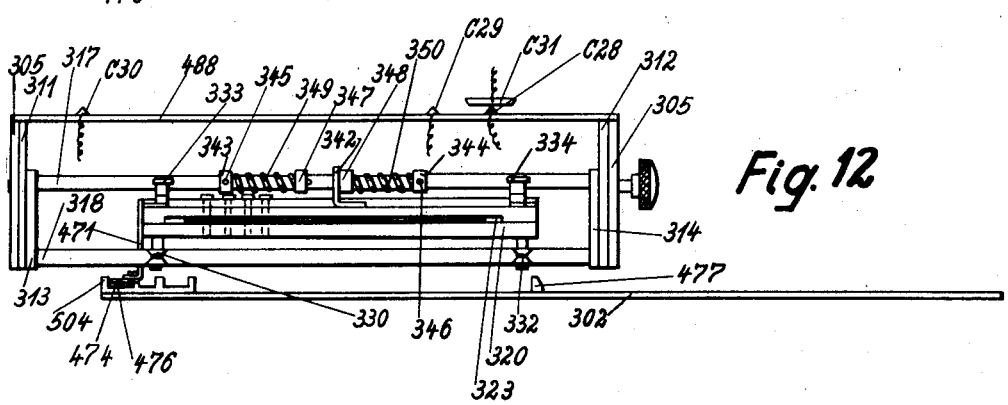

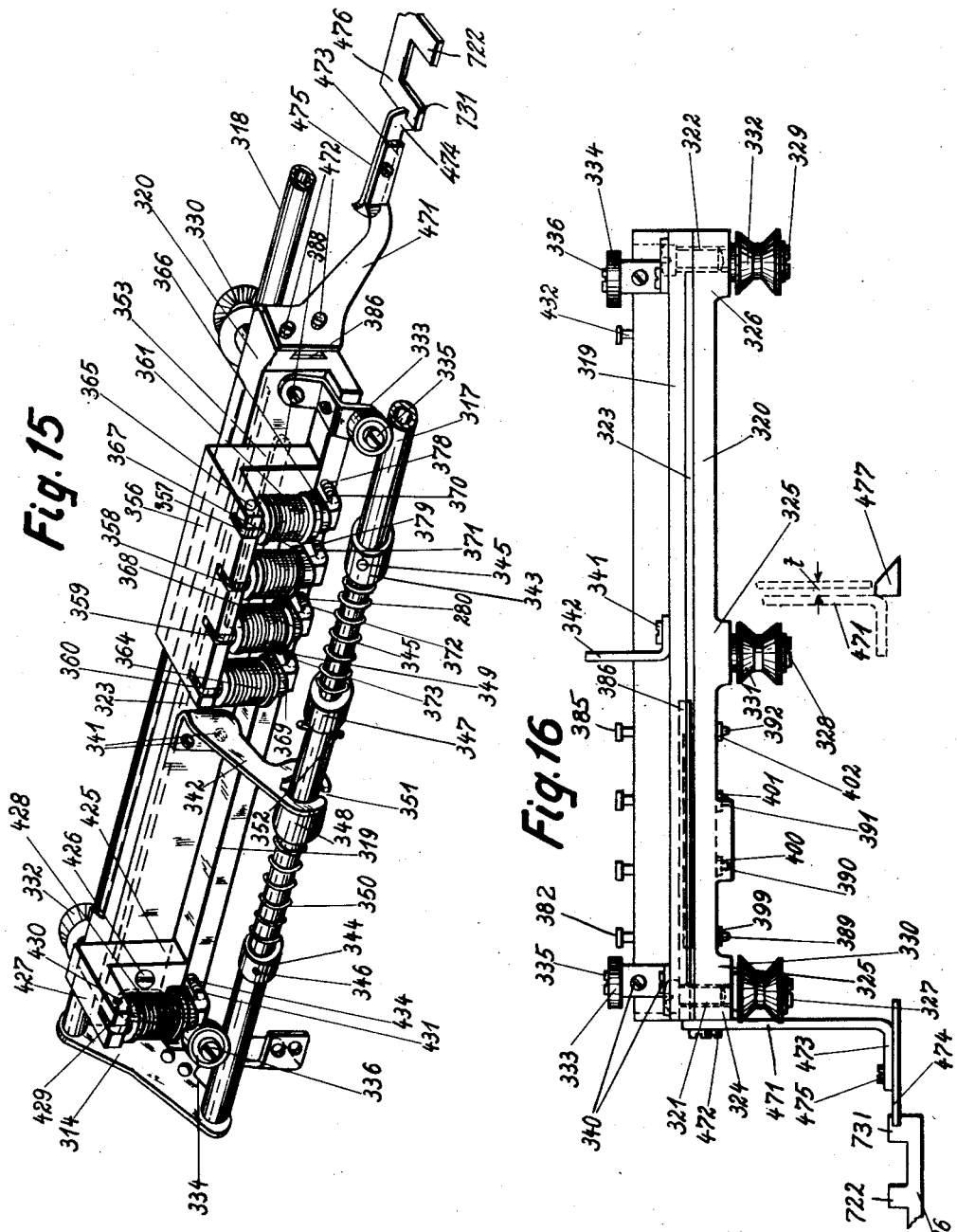

Dec. 4, 1945.  E. MEZ ET AL  2,390,163

TYPEWRITING ACCOUNTING MACHINE

Filed June 22, 1936  12 Sheets-Sheet 9

Fig. 17

Mercedes-Addelektra-Buchhaltung  Account Nr. 32

Name: Hermann Müller  Residence: Hamburg

| Account Nr. | Date | Designation | Turnover | | Old balance | | | | New balance | |
|---|---|---|---|---|---|---|---|---|---|---|
| | | | Debit I | Credit II | Debit III | Credit IV | | | Debit V | Credit VI |
| 375 | 12.3 | Per cash account in bare | | 30750,00 | | 30750 00 | | | | 30750,00 |
| 215 | 9.3 | On cash account | 750,00 | | | 30000 00 | | | | 30000,00 |
| 130 | 1.4 | On cash account | 2800,00 | | | 27200 00 | | | | 27200,00 |
| 58 | 2.4 | On account 36 | 20100,00 | | | 7100 00 | | | | 7100,00 |
| 25 | 3.5 | On account 241 | 9900,00 | | 2800,00 | | | | 2800,00 | |
| 25 | 12.6 | Per cash account | | 3000,00 | | 200 00 | | | | 200,00 |
| 2451 | 17.7 | Per cash account | | 16352,75 | | 16552 75 | | | 3747,75 | 16552,75 |
| 455 | 26.8 | On account 434 | 20300,50 | | | | | | | |

E. Mez
F. Pott
W. Heinze
INVENTORS

By Glascock
Downing &
Seebold
Attys.

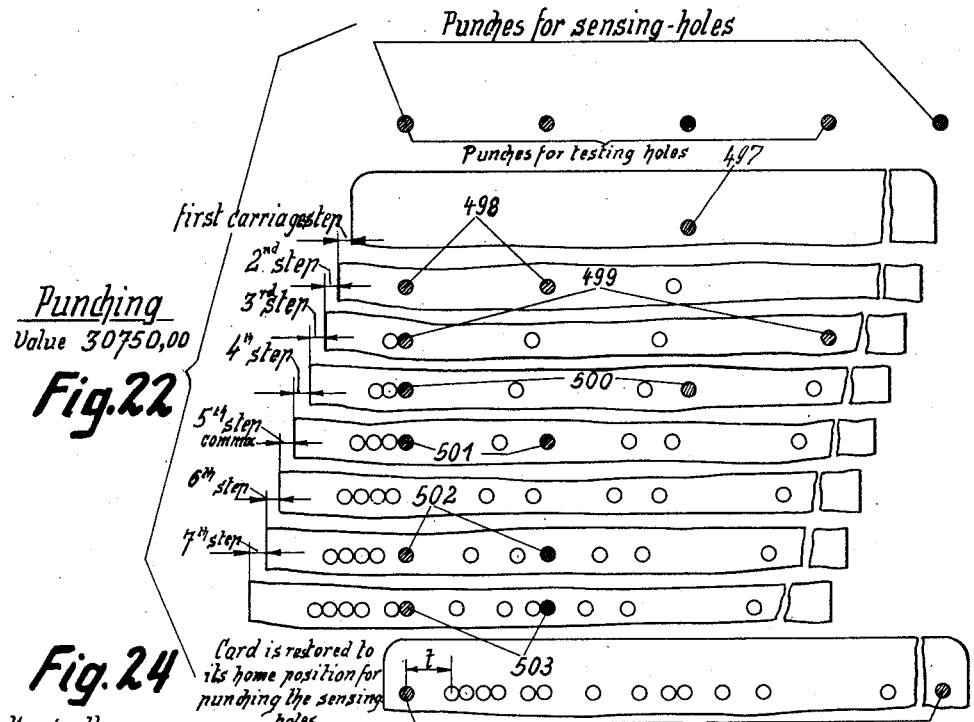
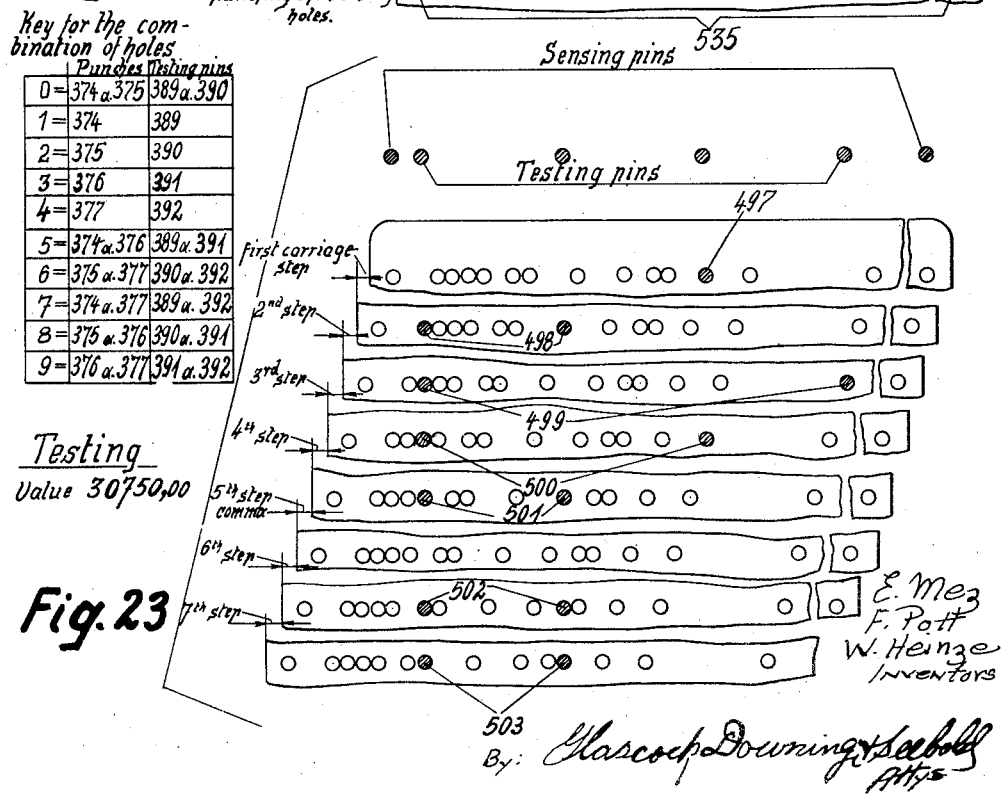

Patented Dec. 4, 1945

2,390,163

UNITED STATES PATENT OFFICE 2,390,163

TYPEWRITING ACCOUNTING MACHINE

Erich Mez, Berlin-Charlottenburg, and Friedrich Pott and Werner Heinze, Zella-Mehlis, Germany; vested in the Alien Property Custodian Application June 22, 1936, Serial No. 86,664
In Germany June 28, 1935

11 Claims. (Cl. 235—59)

The invention relates to improvements in typewriting-accounting machines, and particularly to the ascertainment and the carrying forward of balances.

Up to the present the newly ascertained balance was printed numerically and on being carried forward as an old balance this numerically represented amount was read off and by striking the corresponding figure keys was introduced into the machine. In these operations errors in reading off the amount resulting in typing errors could easily occur which might remain undiscovered for a long time and necessitate a troublesome investigation and thereby a great loss of time.

According to the invention this disadvantage is now overcome, in that the newly ascertained balance in writing out, e. g., in total-taking, is represented by symbols serving as control operations, whereby these symbols on the next bookkeeping operation for the purpose of carrying forward this value as an old balance, automatically control the registration and printing mechanisms. An automatic writing-out of the new balance and an automatic bringing-in of the same as an old balance is thus rendered possible, so that typing errors are completely excluded.

In the drawings one form of construction of the subject of the invention is illustrated by way of example.

Fig. 2 shows a plan of a part of the mechanism according to Fig. 1 on an enlarged scale.

Fig. 4 shows a perspective illustration of a detail of Fig. 3 viewed from the right-hand in front of the machine.

Fig. 5 shows a detail of the mechanism in section according to the line 18—18 of Fig. 1 viewed in the arrow direction A.

Fig. 6 shows likewise a detail of the invention in section according to the line 21—21 of Fig. 1 viewed in the arrow direction A.

Fig. 7 shows a side elevation of one of the control elements of the subject of the invention.

Fig. 8 shows a perspective elevation of the parts represented in Fig. 7 viewed from the left-hand in front of the machine.

Figs. 12, 13 and 14 show a plan of a detail of the invention in different positions.

Fig. 15 shows parts of the mechanism according to Fig. 12 in perspective elevation viewed from the right-hand at the rear of the machine.

Fig. 16 shows a plan of parts of the mechanism according to Figs. 12 and 13.

Fig. 17 shows a part of a card for a card bookkeeping system on which entries are both produced and examined with the assistance of the present mechanism.

Figs. 22 and 23 show diagrammatically the bookkeeping cards in the different positions during the working operations determined by the registrations.

Fig. 24 shows the key for a perforation assembly for the numbers "0" to "9" perforated, by way of example, with four perforating punches.

Fig. 26 is a detail perspective showing the total taking key control of a switch.

Figure 1:
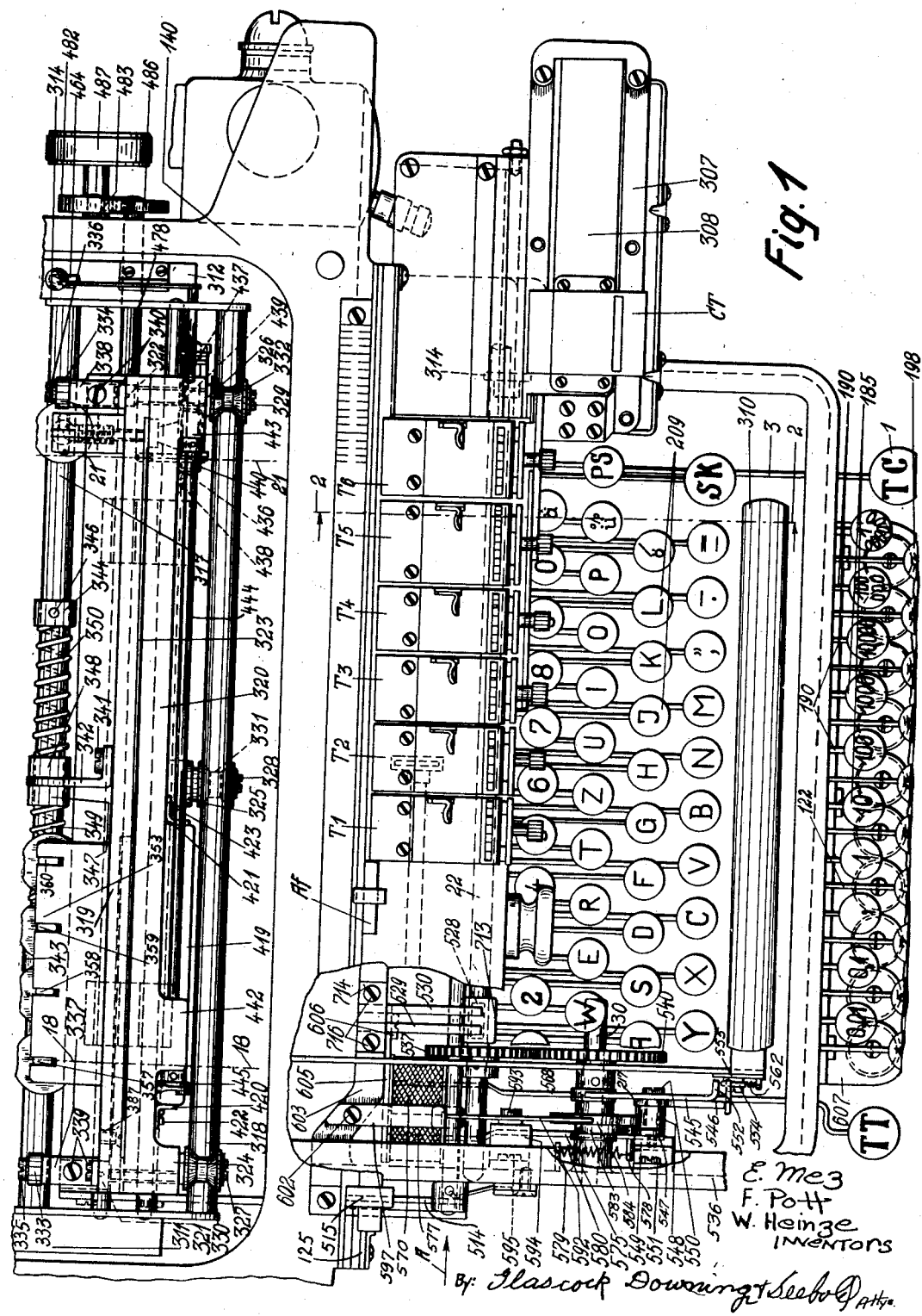
Fig. 1 shows a plan of a part of a Mercedes Addelektra typewriting-calculating machine in which parts of the mechanism according to the invention are incorporated, and in which individual parts are shown broken off in order to expose other parts.

This invention is applied to a power-driven typewriting-accounting machine equipped preferably with a decimal tabulating mechanism, such as disclosed in United States patents to Kammel, No. 2,186,642, issued January 9, 1940; No. 2,236,642, issued April 1, 1941; and No. 2,308,924 issued January 19, 1943, and the following description is to be read with reference to the patented disclosures.

On the depression of the total taking key 1 (Figs. 7 and 16) for the cross footer CT (Figs. 1, 10, 16 and 18) the face 2 (Fig. 7) of the lever 3 acts on the nose 4 (Figs. 1, 2, 5 and 7) of the flap 5. Thus, the flap 5 is swung round the pins 12a, 11a (Figs. 3 and 4), which are journaled in the levers 12 and 11, in the clockwise direction against the action of the spring 6 (Fig. 2). Consequently the lug 7 of the flap 5 slides off the edge 8 of the bearing 9, which is formed as a stop 10. As soon as the stop 10 of the bearing 9 releases the lug 7 of the flap 5, the levers 11, 13, 12 which are rigidly mounted on the shaft 14 and the shaft 14 are rocked round the pins 11b and 9b, rigidly mounted on the bearings 9 and 9a, in the anti-clockwise direction under the action of the spring 16 engaging with the three armed lever 15 in consequence of the pin and slot connection 14a, 15a. The three armed lever is thus rocked round the shaft 30 in the clockwise direction.

General mechanism

The transversely extending parallel rails 303 and 304 fixed to the machine frame 302 (Fig. 3) support the paper carriage 140 already mentioned together with its platen 152. The front bar of the carriage frame 305 of the paper carriage 140 carries a supporting rail 186 along which the column totalizers T1 to T6 are adjustably secured. A table 307 attached to, and projecting forward horizontally from, the calculating mechanism housing 306 is provided with ways to slidingly accommodate a traveling bed 308, which carries a cross footer Ct. In front of the calculating mechanism 306 are located the figure typing keys 309, the letter typing keys 209, the space key 310, the decimal tabulating keys 185 and the calculating keys 198. To the left of the calculating keys 198 (Fig. 1) is arranged the "TT" key and to the right of the calculating keys 198 the total taking control key 1. To the right of the letter typing keys 209 are located the case-shift or type-shift key "SK" and the key "PS" for continuous type-shift. These parts and their arrangements are sufficiently known, and are here referred to, only to complete the description.

The body or frame-work 302 of the machine supports the traveling carriage 305. A platen carriage is supported by the traveling carriage to travel therewith in letter spacing direction and return, the platen carriage also having a limited vertical movement or case shift relatively to the traveling carriage. The platen 152 is journaled in the platen-carriage, the platen being mounted on a platen shaft extending through the end plates 311, 312 of the platen frame and provided at its outer ends with the usual finger knobs 487 (Fig. 1).

Value punching mechanism

Figure 3:
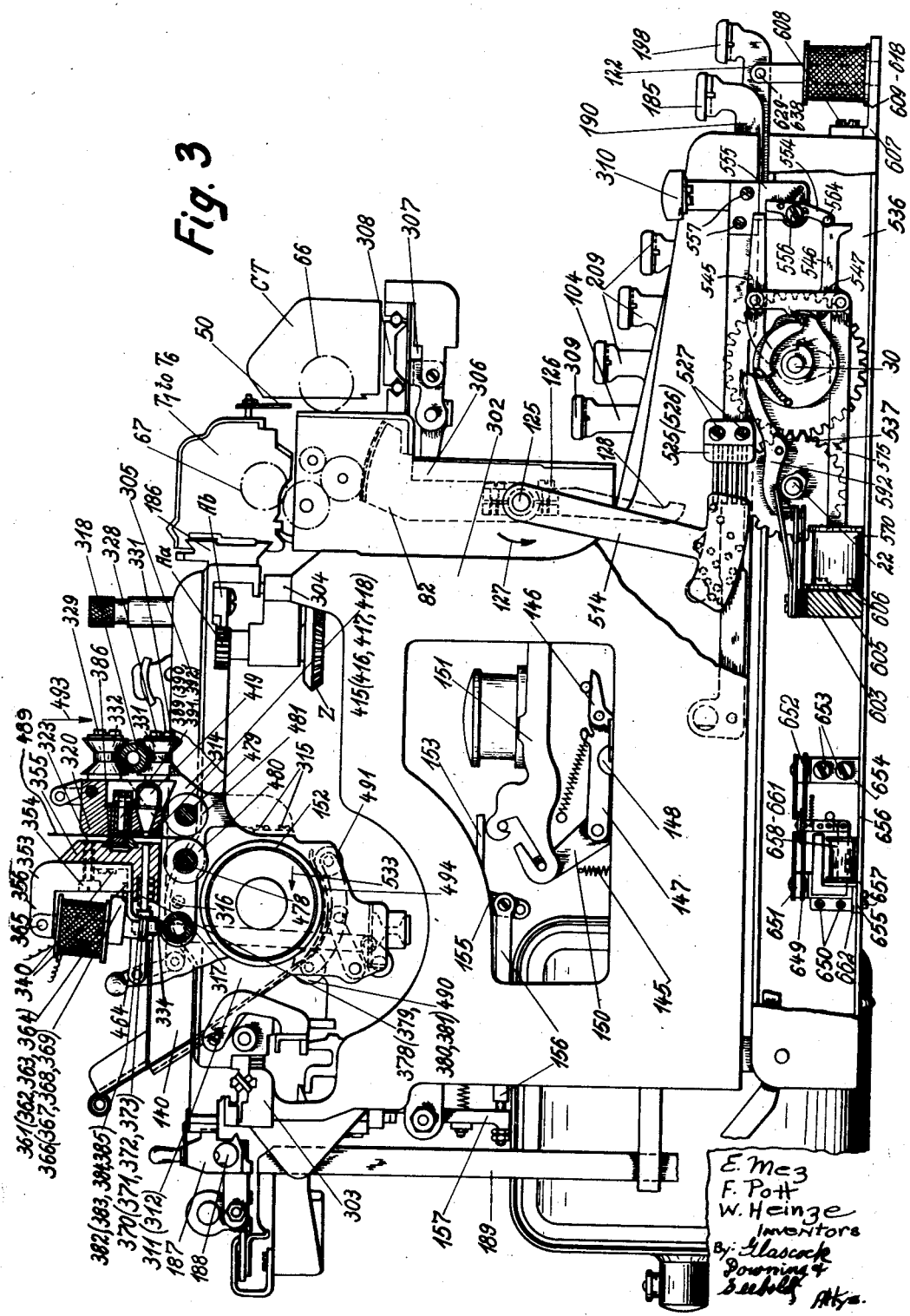
Fig. 3 shows a side elevation according to Fig. 2, in which for the purposes of better illustration some parts are broken off, and other parts are indicated in section according to the line 18—18 of Fig. 1 viewed in the arrow direction A.

To the inner faces of the respective right and left end frames 311, 312 (Figs. 1, 3, 5 and 12 to 15 inclusive) of the case shift frame in which the platen 152 is journaled, the end plates 313, 314 of a value indicating and sensing mechanism are secured at 315 and 316 (Fig. 3).

Rails 317, 318 preferably tubular in cross-section, firmly connect the respective end plates 313, 314 to form a rigid frame.

A pair of horizontally arranged stretcher and guide bars 319 and 320 (Figs. 1 and 3-5) extend between the opposite end walls 313, 314 of the frame for the value indicating and sensing mechanism. These guide bars 319, 320 are located in a plane above the platen and are closely juxtaposed with their apposed sides faced off to form a vertical leading-in slot 323 coinciding or in alignment with a tangent touching the platen at the printing line thereof. Fastenings 321, 322 (Fig. 16) connect the stretcher and guide bars at points beyond the ends of the leading-in slot formed between the bars. The leading-in slot serves as a guide for the introduction of the record material hereinafter described. The upper edge of the rearmost guide bar 319 is extended above the corresponding edge of the foremost bar 320 and is beveled to facilitate the insertion of the record material into the leading-in slot.

To enable the guide bars 319, 320 and their associated mechanisms to travel transversely of the machine relatively to the rigid frame 313, 314, 317, 318, bosses 324, 325, 326 (Fig. 16) arranged in spaced relation on the front face of the foremost guide bar 320 carry forwardly projecting studs 327, 328 and 329 on which coned supporting rolls 330, 331, 332 (Figs. 3, 5 and 15) are journaled. The studs are arranged in staggered relation, the central roll 331 being in a horizontal plane below the end rolls 330, 332, to take over the tubular rail 318. Also rolls 334 and 335, Figs. 1 and 3, are journaled on studs 335 and 336, projecting rearwardly from the rearmost guide bar 319 near the opposite ends thereof and resting on the rear tubular rail 317.

A guide bracket 342 secured at 341 to the rear face of the rearmost guide bar 319 and centrally of said bar, is apertured at its outer end to embrace and shift along the supporting rail 317 and, assisted by the lower traction roll 331 on the front tubular rail 318, prevents removal of the value representing and sensing mechanism from the rails.

Spaced collars 343 and 344 (Figs. 15 and 1) secured as at 345 and 346 to the rear tubular rail 317 constitute abutments against which rest the respective outer ends of a pair of spaced centering compression springs 349 and 350 coiled about the rail 317.

The opposite or inner ends of the coiled compression springs bear against sleeves 347, 348 respectively, slidable along the rear tubular rail 319 which sleeves, in the normal position of the traveling value representing and sensing frame relatively to the case-shifting frame, lie on opposite sides of and in contact with the free end of the guide bracket 342, the aperture in which is recessed, as at 351, to accommodate an arresting pin 352 driven through the tubular rail 317 between the sleeves 347, 348 to limit the approach of the sleeves towards each other. As far as thus explained, the value representing and sensing carriage or truck, comprising the guide bars 319, 320, with their supporting rolls 330, 331, 332, 333 and 334 and guide bracket 342, and the rigid frame 313, 314, with its rails 317, 318 secured to the case shift frame, mounted on the paper carriage, are capable of relative longitudinal movement, the centering springs 349 and 350 on the rigid frame operating normally to maintain the value representing and sensing carriage or truck at a predetermined point on said rigid frame.

The rearmost guide bar 319 is angular in cross-section, and to its rear face near one end an angular supporting bracket 353 (Figs. 1, 2, 5 and 15) is secured at 354, which angular bracket forms a part of the value representing means. The bracket is inverted in relation to the angular guide bar, the upper flange 356 of the bracket 353 projecting rearwardly in an overhang which is slotted, as shown in Figs. 1 and 15, transversely of which slots a supporting rod 365 extends.

The upper ends of cores 357, 358, 359 and 360 pivotally mounted on the rod 365 are accommodated in the respective slots.

Magnet coils 361, 362, 363, 364 surround their respective cores, the lower ends of the cores having enlargements 366, 367, 368 and 369 (Figs. 3, 5 and 15) formed thereon capable of co-acting with the vertical leg of the supporting bracket 353 on closure of an electric circuit. The angular bracket 353 with the cores 357—360 and their windings or coils 361—364 constitute, in effect a multiple horse-shoe magnet. The magnets and their cores lie at a rearwardly inclined angle to the adjacent vertical face of the rearmost guide bar 319 (Figs. 5 and 6), the lower ends 370, 371, 372, and 373, respectively, of the cores being headed and operating as hammers to drive forwardly the horizontally arranged headed punches 374, 375, 376 and 377. These punches are guided in corresponding horizontal holes formed in the rearmost guide bar 319 of the record making and sensing truck, to intersect the vertical guide slot 323 between the guide bars 319, 320. Individual compression springs 378, 379, 380, 381, encircling the stems of their respective punches and held between the heads 382, 383, 384 and 385 of their punches and counter-sunk seats in the guide bar 319, normally project the punches rearwardly so that their effective ends are withdrawn from the guide slot 323. The springs also press the lower free ends of the cores 370—373 rearwardly clockwise around the bearing rod 365 (Figs. 3 and 5) until the upper ends of the magnet coils contact the overhanging flange of the supporting bracket, so that the parts normally lie in the positions shown in Fig. 5.

Figure 21:
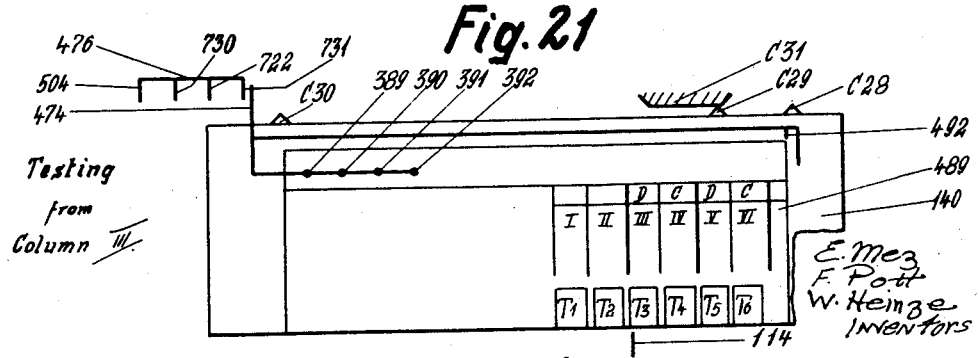

A dovetailed slot is formed longitudinally of the front guide face of the rearmost guide bar 319, along a horizontal plane one line space above the line of punches 374—377. This seat accommodates a correspondingly formed lining 386 (Figs. 1, 3, 5 and 15) of an insulating material held against displacement by a screw 387 (Fig. 1). A bus bar 388 (Fig. 15) pressed into the lining 386 is capable of co-acting with contact pins 389, 390, 391 and 392 (Figs. 2 and 21) mounted for longitudinal movement in small bushings 393, 394, 395 and 396, Fig. 5, pressed into insulating sleeves 399, 400, 401 and 402 (Figs. 2, 5 and 16). The insulating sleeves 399 to 402 on their parts are pressed into corresponding holes formed transversely of the perforator carriage front guide bar 320. These holes extend horizontally through the stem of the inverted L-shaped front guide bar and open into the leading-in slot 323 formed between the apposed vertical faces of the guide bars 319, 320. The holes in the base of the guide bar 319 which accommodate the punches 374—377 likewise extend clear through the base of said guide bar and open at their forward ends on the record card slot 323. The leaf springs 403, 404, 405, 406 (Figs. 2 and 5) fixed on the front face of the foremost guide bar 320 between insulating plates 407, 408, 409, 410 and screws 411, 412, 413, 414, press the inner ends of the contact pins 389 to 392 constantly but lightly against the bus bar 388. Dies 415, 416, 417 and 418 (Figs. 3, 2 and 5) are fixed at the inner ends of horizontal outwardly flared openings 424 formed in and extending through the stem of the inverted L-shaped front guide bar 320, in line with the hole punches 374 to 375 already described. These punches co-act with their respective dies for the purpose of punching a record card, as hereinafter described. A receptacle 419 (Figs. 1, 3 and 5), with which the flared outer ends of the several holes 424 communicate, is secured by angle brackets 420 and 421 (Fig. 1) welded to it fastened at 422 and 423 to the supporting member or front guide bar 320, which receptacle serves for the reception of the card punchings, which fall into it through said corresponding holes 424 (Fig. 5) provided both in the housing 419 as well as in the guide bar 320. Separated from the extreme left hand punch 382 (Fig. 16) by a distance nearly equal to the width of a record card (Figs. 22 and 21) and near the right hand side of the amount-representing and sensing carriage 319, 320 (left hand end as seen in the rear view Fig. 15), an inverted L-shaped supporting bracket (Figs. 1, 6 and 15) is fixed to the rear face of the rearmost guide bar 319 at 426, and to the overhanging flange 427 of the bracket 425 a further magnet coil 428 together with its core 429 is guided in a corresponding slot formed in the overhanging flange 427. A pivot 430 on which the upper end of the core 429 is pivotally supported, passes transversely through the slot. The lower end of the coil core 429 is capable of co-acting by means of its headed end 431 with a punching pin 432 (Figs. 6 and 16) longitudinally operable in a hole of the guide bar 319. A spring 434 encircling the punch pin between a head 433 on the punching pin 432 and a corresponding counter-sunk shoulder in the punch pin receiving hole formed in the guide bar 319, presses the head of the punch pin constantly against the end 431 of the coil core 429 to rock the core together with the coil 428 in the anti-clockwise direction round the pivot 430. This swinging movement is limited by contact of the core 428 with the bevelled overhanging flange 427 of the angular bracket 425, whereby the rest position of all parts acted on by the spring 434 is determined. This punching pin 432 co-acts with a die 435 fixed in the inner end of an outwardly flaring opening 441 in line with the punching pin and extending through the guide bar 320, when a hole is to be made in a record card described hereinafter. A receptacle 440 (Figs. 1 and 6) secured by angle pieces 436, 437 to the outer face of the guide bar 320 at 438, 439, and communicating with the flared outer end of the hole 441 (Fig. 1) serves for the reception of the card punchings which fall thereinto through hole 441.

*Edge perforation sensing mechanism*

A shaft 444 (Figs. 1 and 4) extending parallel with the outer face of the guide bar 320, and journaled in lugs 442 and 443 projecting from the guide bar, carries spaced crank arms 445, and 451 fast thereon.

The crank arms 445 and 451 are each pivotally connected by pins 450 and 456, with the outer slotted ends of sensing pins 448 and 455, respectively, slidably mounted in horizontal apertures extending through the foremost guide bar 320.

These sensing pins 448 and 455 are spaced apart a distance nearly equal to the width of a record card, and greater than the distance between the extreme left hand and right hand punches 374 and 435.

It will be noted that the four contact pins 389—392, lie above and in the same vertical planes with the four punches 374—377, and that the sensing pin 455 lies in a vertical plane adjacent to that in which the extreme left hand punch 432 is located (Fig. 1).

A third crank arm 460 (Fig. 4) is journaled on the extreme right hand end of the shaft 444, said third crank arm being held by means of an adjusting collar 462 fixed by a screw 461 on the shaft 444. A co-acting crank arm 457 is fast on the sensing pin shaft 444 adjacent the loose crank arm, the crank arms 445 and 457 by contact with the shaft supporting lugs 442 and 443 serving to prevent endwise motion of the shaft. The crank arms 457 and 460 are interconnected with one another by a torsion spring 463 arranged between them on the shaft 444, whereby the spring projects with its one end into a corresponding hole of the crank arm 457 and with its other end into a similar hole of the crank arm 460. An actuating or paper feed roll cast off lever 464 (Figs. 1, 3 and 4) is articulately jointed at 465 to a connecting member 466 guided in its endwise movement by two guide angles 468, screwed to the already described case-shift frame end plate 312 at 467. A pin 470 projects laterally from the forward upturned end of the connecting member 466 through a corresponding hole in the crank arm 460 and thereby connects the crank arm 460 with the actuating lever 464 by way of the connecting member 466, so that the crank arm 460 is laterally displaceable in relation to the pin 470 without losing the driving connection with the crank arm 457 through the spring 463, or with the actuating lever 464 through the link 466 and the laterally projecting pin 470.

A hanger 471 (Figs. 12 to 16) fastened at 472 to the left hand end of the guide bar 320, projects downwardly and forwardly and at its forward end, is offset to form a lug 473 pivotally supporting at 475 a dog 474 which co-acts in a manner hereafter explained, at one end of its travel, with a series of spaced apart teeth 504, 730, 722 and 731 (Figs. 12–14 and 18–21) projecting from a plate 476 fixed on the machine frame. The dog 474 at another point in its travel, co-acts with a positioning cam 477 also fixed on the machine frame 302.

The dog 474 is frictionally retained in any of the positions which it may assume, relatively to its supporting lug 473.

Contacts C28, C29 and C30 (Figs. 12, 13, 18–21 and 25) are fixed on a bar of insulating material in parallel relation with, and mounted on the carriage frame 305 and may contact an insulated rail C31 fixed to the machine frame.

On each of two further parallel shafts 478 and 479 (Fig. 5) mounted between the two case-shift frame end plates 311 and 312 (Fig. 3) are adjustably mounted two or several forward or card feeding rollers 480 and 481. The end of the shaft 478 projecting from the right hand end plate 312 of the paper carriage 140 (Figs. 1 and 5) carries a roller 482 fast thereon, and in driving connection with a roller 484 journaled on a stub shaft 483. The latter roller 484 is also in driving connection with a roller 486 rigidly mounted on the platen shaft 485. In this case, on rotation of the platen 152 by means of the hand knob 487, the drive is effected to the shaft 478 and its rollers 480 by way of the friction drive 482, 484, 486 (Fig. 5). The rollers 481 together with the shaft 479 are spring pressed toward the rollers 480 and thereby participate in the drive.

The differential shaft 125 (Figs. 3 and 11) protrudes beyond the left-hand side of the calculating mechanism housing 306 (Fig. 3). On the projecting end of the shaft 125 is fixed an arm 514 (Figs. 1, 3 and 11) by means of its hub 515 and a pin 516. To the lower segment-formed end 517 is fixed an insulating part 517a a metal plate 518 and a plate 519 of insulating material, Fig. 11. Contact pins 520 fixed in the metal plate 518 project through corresponding holes of the outer insulating plate 519. The contact pins 520 are capable of co-acting with the resilient contact fingers 521, 522, 523 and 524.

It will be noted that the contact pins 520 are arranged in four arcuate rows from top to bottom of the segmentally shaped lower end of the pendulum-like arm 514, and that there are but four pins in a row, the pins in each such row being irregularly spaced apart, in accordance with a predetermined plan.

The contact fingers 521 to 524 are clamped between two plates 525 and 526 (Fig. 3) of insulating material which are fastened at 527 to the machine frame 302. These parts are covered up and protected on the outside by a casing (not illustrated).

The mode of operation of the value perforating mechanism will be described in the following section by the aid of an example:

*Method of operation in value punching*

For the description of the method of operation let it be assumed that the entries are to be performed according to the record card 489 partially illustrated in Fig. 17.

Figure 18:
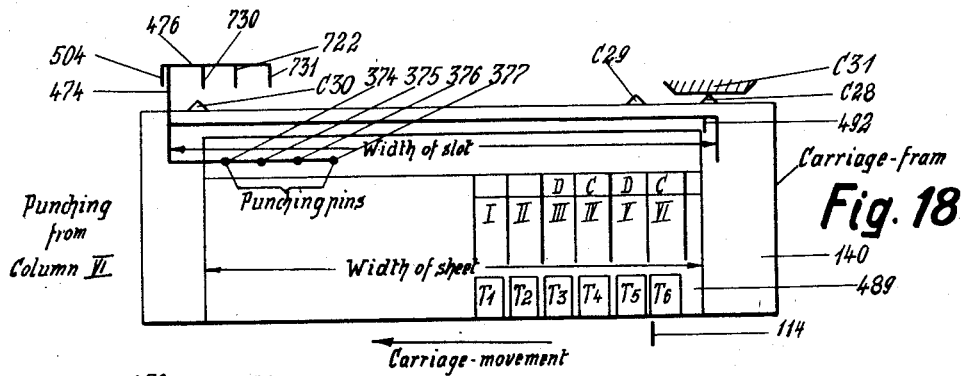
Figs. 18 to 21 show diagrammatically the different positions of the paper carriage, cards and of the symbol-producing and symbol-sensing mechanism.
Figure 19:
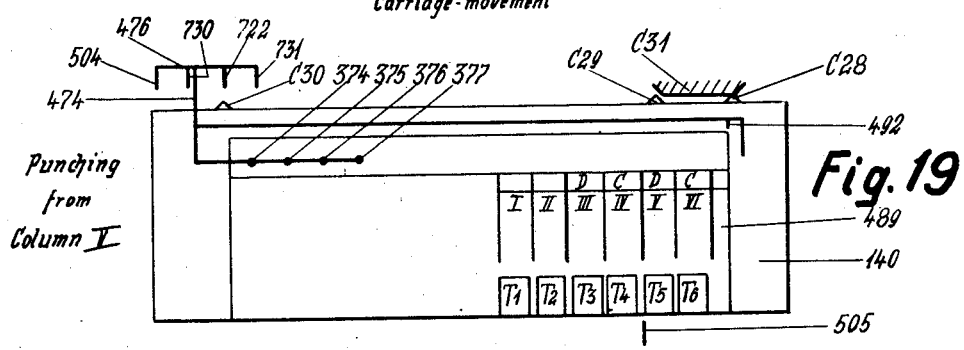

It may be remarked to commence with that when the feed roll cast-off lever 464 for the lower paper feed rollers 490 and 491, is in its normal position shown in Figs. 3 and 4, these rollers contact with the platen 152. In this position of the release lever 464 the pins 448 and 455 which sense the edge perforations of the account card are in their retracted or inoperative position illustrated in Fig. 19. The account card 489 (Fig. 17) of relatively stiff material, may be inserted downwardly in the slot 323 (Fig. 16) formed between the opposed faces of the guide bars 319 and 320 of the perforator carriage, until its lower edge as is shown in Fig. 3 lies between the rollers 480 and 481. The account card 489, moreover, is introduced with its right-hand edge at a distance t (Fig. 17) from the right-hand edge of the slot 323, which distance can be indicated by a mark 492 (Fig. 18). By rotating the usual knob 487 (Fig. 1) of the platen 152 the rollers 480 and 481 are rotated in the manner described under the section "Value punching mechanism," whereby the account card 489 is carried downwards in the arrow direction 493 (Figs. 3 and 5). Its lower edge is then led around the platen either by hand or by a correspondingly arranged guide plate located between the platen 152 and paper guide plate 494 (Figs. 3 and 5), where it is gripped by the front lower feed rollers 491. By rotating the knob 487 (Fig. 1) of the platen 152 further, the account card 489 is now forwarded also through the co-operation of the platen 152 with the lower feed rollers 490 and 491. The friction gearing or rollers 482, 484, 486 may be proportioned so that the rollers 480, 481 have the same peripheral velocity as the platen and lower feed rolls 490, 491. The account card 489 is now moved in the arrow direction 493 until it is located with its line 495 indicated in Fig. 17, at the typing line level.

Then the name "Herman Müller," place of residence "Hamburg," and account number "32," are typed, in which operation the paper carriage and the perforator carriage shift together in letter spacing direction.

After this typing on line 495 has been effected the account card 489 is moved upwardly by a rotation of the knob 487 (Fig. 1) until the line indicated by 496 in Fig. 17 lies at the typing height. After this upward card movement has been effected the columns I to VI of the account card 489 are clearly visible, so that now, if this has not already been effected, the totalizers T1 to T6 (Fig. 1) can be placed on the carriage and the tabulator riders 187 (Fig. 3) adjusted in relation thereto.

Now the account No. "375," the date "12.3" and the text "Per cash account in bare" are typed. Then the paper carriage is tabulated to the highest denomination of the column II in the manner described under the section "Tabulating device," by pressing on the corresponding tabulator keys, namely, the keys "0.01" and "10000," the depression of the key 0,01 or it may be any other tabulator key, causing the carriage to skip the column I in which no entry is made, while the depression of the tabulator key "10000" brings the carriage into the highest denomination of the column II.

By depressing the corresponding calculating keys 198, the value "30750,00" is typed in the column II, and as shown in U. S. Patent to Kammel 2,236,642, April 1, 1941 (filed May 14, 1934), is simultaneously registered in the totalizer T2, and in the cross footer CT. It may be remarked at this point that on depression of the calculating keys 198, substantially the same operations occur as are described under the section "Total-taking," and since this mechanism does not belong to the invention it will not be further described. Since the pre-setting state-control plate 50 (Fig. 3) of the totalizer T2 for the control of the kind of calculation of the cross footer CT is set in this case for addition, the value "30750,00" is registered additively in the cross footer CT. Now, by further tabulating operations the paper carriage 140 positions the column VI of the card 489 in the typing position.

In this column the value "30750,00" is to be cleared from the cross footer CT, and registered in the totalizer T6.

According to the invention, however, the value "30750,00" during the clearing operation from the cross footer CT, is to be perforated automatically at 497 to 503 (Fig. 17) which is effected as follows:

First, as shown in Figs. 12–16, the dog 474 pivoted on the forwardly and downwardly projecting hanger 471 arranged on the perforator carriage, which dog, because of the tabulation of the paper carriage 305 with its case shift frame, and its perforating sensing frame 319, 320, 317, 318, is now located opposite to the tooth 504 of the stop bar 476 (Figs. 12 to 14 and 18 to 21) is brought manually into engagement with the tooth. As a result, the perforator carriage 319, 320, which up to the present has travelled in common with the paper carriage 140 to the left, now remains stationary while the paper carriage 140 travels farther to the left. Meanwhile in the previous common movement of the paper carriage and the perforator carriage to the left to locate the column VI of the record card at the printing zone, and the totalizer T6 at the adding zone, the contact C28 arranged on the paper carriage 140 is brought into operative relation to the contact C31, rigidly mounted on the machine frame 302. This position is shown in Figs. 27 and 18, in which the stop bar 476, the perforator carriage 319, 320 (Fig. 12), the contact C31, and the main drive wheel 114 for driving the totalizers T1 to T6 are diagrammatically illustrated in heavy lines to indicate that they are not axially or longitudinally movable during the operation of printing and perforating the amount, while the parts moving to the left and now independent of the perforator carriage 319, 320, namely, the paper carriage 140, the account sheet 489, and the totalizers T1 to T6 are represented in light lines. The account sheet 489 held on the platen 152 by the feed rollers 490, 491 (Fig. 3) and the rollers 480, 481, on the farther travel of the paper carriage 140 to the left, will shift with the paper carriage, and along the slot 323 of the perforator carriage 319, 320, and consequently changes its position in relation to the punching pins 374 to 377, at each carriage step, which it can do unimpeded since the margin hole sensing pins 448 and 455 (Figs. 1 and 4) are located in the inoperative position.

Now after depression of the corresponding tabulator key which results in locating the paper carriage 140 at the position wherein the highest denomination of the value "30750,00" is at the printing position and the corresponding totalizer wheel is in mesh with its master wheel, in the manner described under the section "Tabulating device," the total-taking key indicated by TC (Fig. 1) is depressed, to initiate the total-taking operation in the manner described under the section "Total-taking." The value "30750,00" registered in the cross footer CT is thereby automatically cleared denomination by denomination out of the cross footer, and registered in the totalizer T6, located in operative position relatively to its master wheel. Coincident therewith the value or amount is likewise automatically typed in the column VI of the card 489 (Fig. 17) as a new balance.

In the present mechanism the typed value which in the total-taking operation, is transmitted from one totalizer to the other and simultaneously typed on the card 489, is at the same time punched automatically denomination by denomination in a suitable position, for example, on the left-hand side of the card 489 (Figs. 17 and 22). The horizontal line of punches 374–377 are positioned a predetermined distance above the printing line on the sheet and on the platen 152 so that the value punching takes place between the typing lines of the card (Fig. 17). Therefore, the record card 489 is located for the first blank line to be typed, by registering the proper marginal line indications 496, 722 (Fig. 17) with a suitable aligner or gage (not shown, but common in the art). The line of punches 374–377 will then be located at such a distance from said blank line as to perforate the record card between two previously typewritten lines. In the form shown in Fig. 17, the perforated representation of the typewritten total "30750.00" at the right-hand end of the first line printed on the body of the statement, appears on the left-hand side of the statement just above the typewritten superscription "Herman Müller," the line of perforations representing the second typewritten total "3000.00" appearing just beneath said superscription. Since in the present mechanism, the perforations representing the digits "0" to "9" are formed not by ten but only by four hole punches, 374, 375, 376 and 377 (Figs. 1 and 2) it is necessary that these four hole punches are operated singly, or by twos in the perforation of a value for the digits "0" to "9." This actuation of the hole punches is effected according to the code illustrated as a table in Fig. 39. The distance from one punch to the next in the series of four punches must also be somewhat greater than the greatest number of denominational orders of the totalizer. In the punching operation the following mechanisms are operated:

On the depression of the total taking control key 1 (Fig. 1), an insulator member 506 (Fig. 26) arranged on the key lever 3, acts on the spring 507, whereby the contact point 508 contacts with the contact point 509 of the spring 510. The same cross footer total key controlled contacts 508, 509 are shown diagrammatically in Fig. 25, to which reference is also directed. It may be remarked at this point that the two springs 508 and 510 are insulated from one another by an insulator member 511, and that the spring contact switch 507, 510 and 511 is fastened by screws 512 to an angle piece 513 of insulating material which is mounted on the machine frame 1 by means not illustrated.

The clearing of the value effected in the total-taking results, as described in detail in the section "Total-taking," by the operation of the toothed segment 82 (Fig. 11), in which operation the latter makes no movement for the digit "0," while for the digits "1 to 9," it rocks with the shaft 125 progressively for nine different extents. These rocking movements are transmitted to the contact carrying segment lever 514 fast on the same differential shaft 125 with the differential segment 82.

If, therefore, the first digit "3" of the value "30750,00" of the first entry is cleared from the cross footer CT, the toothed segment 82 (Figs. 3 and 11) and with it the contact carrying segment arm 514 are rocked counter-clockwise (Fig. 3) four steps or increments of movement under control of the cross footer totalizer wheel in the tens of thousands order or denomination. As a result, the segmental contact carrier 514 will have positioned the proper contact point ("3" in Fig. 25) in engagement with the finger 523 of the four parallel contact fingers 521–524 (Figs. 3, 11, and 25) which contact fingers are arranged in the paths of the four arcuate rows of contacts 520 on the rocking contact carrier. After the contact carrier 514 has come to rest in this advanced position after making the contact, the contact C32 (Fig. 25) is closed by the insulated contact plate 528 (Fig. 1) arranged on the continually rotating shaft 22 (Figs. 3 and 25), and the contact springs 529 and 530. The circuit now closed may be traced as follows: from the source 531 (Fig. 25) to the repeatedly opened and closed contact C32, thence to main contact plate 518 mounted to rock with the differentially rocked arm 514, and the selected contact point 520 on such plate 518, through the contact finger 523 to the punch magnet 363 which operates its punch 376 to perforate the record sheet 489. From the punch magnet, the circuit returns through traveling carriage contact C28 (Figs. 12–14, 18–21 and 25) to the stationary contact C31 of sufficient length to maintain the contact throughout the travel of the carriage across column VI, and through the total key controlled contacts 508, 509 to the source 532.

Parts of this circuit are temporarily closed and opened incident to each machine cycle, as by the motor-driven shaft controlled switch 528–530, Fig. 1, operated at each rotation of the shaft 22, and also at the points between the four resilient contact fingers 521–524 and the four arcuate rows of contacts 520, effected at each calculating operation of the machine, but the punch-controlling circuits are completed when the paper carriage locates the successive denominational places of column VI of the record sheet 489 at the printing point, at which time, the contacts C28 and C31 are engaged, and the depending contact carrying arm 514 is rocked under control of the successive cross footer totalizer wheels 66 bearing significant digits to select the punch magnet or magnets 361—364 which will effect a perforation on the record sheet 489 representing the value of the digits on the successive totalizer wheels. In the example given, the magnet coil 363 is energized, whereby the core 359 (Figs. 1 and 15) with the enlargement 368 is attracted to the stem 353 of the inverted L-shaped supporting bracket (Figs. 1, 3, 5 and 15). The end 372 of the coil core 359 thereby acts on the head 384 of the punching pin 376 forcing the punch forwardly against the tension of the spring 380 and in the opposite direction to the arrow 533 (Fig. 17) to perforate the card 489. A hole 497 (Fig. 22) for the number "3" has therefore been formed in the card 489. The punched-out disks pass through the hole 424, into the receptacle 419, and thus cannot fall into the machine so as to interfere with the mechanism.

The contact plate 528 (Figs. 1 and 25), arranged on the continually rotating shaft 22 and contact fingers 529, 530 remain closed for a short time only and when the circuit is interrupted at this point, the coil 363 with its core 359 and the punching pin 376 are immediately returned into their initial positions by the spring 380 so that the punching pin 376 is withdrawn from the card 489, after which the carriage step follows after typing the number "3," in the column VI of the card 489, the number having been cleared from the cross footer CT. The paper carriage 140 with the card 489, therefore, advances one step to the left, the card 489 shifting relatively to the slot 323 of the perforator carriage 319, 320 (Figs. 1 and 12) and to the series of punches mounted on the perforator carriage which according to what has been said above, is held fast in its position because of the arresting engagement of the dog 474 with the tooth 504 of the stop bar 476, see Figs. 12–16 and 18. Now the second digit "0" of the value "30750,00" is cleared from the cross footer CT, and registered in the totalizer T6. In this operation the toothed differential segment 82 (Fig. 3) is permitted no counter-clockwise travel, and hence the contact carrying arm 514 does not rock to interrupt the normally closed connection between the pair of contact pins 520 in the extreme right hand vertical row of pins corresponding to the digit "0" and the contact fingers 521 and 522, and after the contact C32 is closed in the manner hereinbefore described, the following circuit is closed: 531, C32, 518, 520, 521, 522, punching magnets 361 and 362, C28, C31, 508, 509, and 532. The magnet coils 361 and 362 are energized and the cores 357 and 358 (Fig. 15) are attracted against the action of the springs 378 and 379 in the manner hereinbefore described, so that the card is perforated as shown at 498 (Fig. 22) with two spaced apart perforations corresponding to the digit "0." It will be noted that the spacing between the two perforations 498 is much greater than the spacing between adjacent perforations, or otherwise stated, the perforations 498 are separated by a space several times greater than the diameter of a perforation.

Furthermore, contrary to the usual typing operation, the last-named perforations 498 are made at a point in the record sheet some distance to the left of the first-named perforation 497. After, as above described, the punching pins 374 and 375 have been restored by their springs, and the digit "0" typed in the column VI of the card

489, a further carriage step takes place, which positions the card one step farther to the left. The totalizer wheel registering the digit "7" of the value "30750,00" in the cross footer CT is brought to zero by the toothed segment 82, during which the contact carrying arm 514 rocks counter-clockwise seven steps to enable the contact pins 520 corresponding to the digit "7" to make connection with the contact fingers 521 and 524, so that after the contact C32 is closed the current takes the following path: 531, C32, 518, 520, 521, 524, magnet coils 361 and 364, C28, C31, 508, 509 and 532. The cores 357 and 360 (Figs. 2 and 15) of the magnet coils 361 and 364 upon energization of the coils, are rocked counter-clockwise (Fig. 5), whereby the punching pins 374 and 377 are driven in the opposite direction to the arrow 533 against the tension of the springs 378 and 381, to perforate the record sheet 489, as at 499 (Fig. 22), to represent the digit "7" consisting of two holes. This digit "7" is now typed in the column VI on the card 489 after the contact C32 has previously been re-opened and the punching pins 374 and 377 returned into the initial position by the springs 378 and 381, that is, they are withdrawn from the card 489. The paper carriage 140 with the card 489 escapes another step to the left. Attention is directed to the fact that the two spaced-apart perforations 499 which together represent the digit "7" have been applied to the record sheet, the one to the right of and immediately adjacent the left hand one of the perforations 498 representing "0" whereas the remaining perforation forming part of the representation of the digit "7" is located a considerable distance to the right of the first perforation 497 representing the digit "3."

It will be observed that the foregoing perforations representing the digits "3," "0" and "7," respectively are all arranged in a single straight line, the representations being interspersed and not following each other in the order of application, i. e., in the order in which the perforations were formed.

Also it will be noted that no perforations are formed in the record card to represent zeroes above the digit of highest order, or otherwise stated, only the digits of the amount or value are represented by perforations.

In order to provide for any succession of digit values from "0" to "9" in any ordinal relation, it is necessary to arrange the four perforating punches 374-377 at such relative distances apart as to avoid overlapping the perforations irrespective of the value and ordinal succession of the digits constituting an amount.

It is also desirable to use perforating punches of as small diameter as will permit of accurate sensing.

It has been determined that any combination of digit values and denominations can be accommodated in a one-high horizontal line of interspersed perforations by spacing the successive punches apart from their adjoining punches a distance equal to the diameter of one perforation times the number of totalizer wheels in the totalizer, the diameter of a perforation being slightly less than the length of a letter space. Assuming a cross footer totalizer having ten totalizer wheels, the punches 374, 375, 376 and 377 will be spaced apart a distance somewhat greater than ten times the diameter of a punch hole, that is to say, a space sufficient to accommodate ten perforations in a single row is left between each two successive punches, or in other words, the space between adjacent punches is greater than the width of the totalizer or of the combined orders thereof, with which the punches are associated, to prevent overlaping of perforations. Now the digit "5" of the value "30750,00" is cleared from the cross footer CT, whereby the contact-carrying arm 514 rocks counter-clockwise a distance corresponding to this digit, and thereby connects the contact pins 520, associated with the digit "5," with the contact fingers 521 and 523. As soon as the contact C32 is closed, the current takes the path 531, C32, 518, 521, 523, magnet coils 361 and 363, C28, C31, 508, 509, 532. The magnet coils 361 and 363 are energized, whereby their cores 357 and 359 are attracted and drive the punching pins 374 and 376 against the tension of their springs 378 and 380 to perforate the record sheet 489, as at 500 (Fig. 22), with two spaced-apart holes to represent the digit "5." On the corresponding typing of the digit "5" the carriage with the card 489 is again shifted to the left one step after the contact C32 has been previously re-opened, and the punching pins 374 and 376 returned into their initial positions. Now the next digit "0" of the value of "30750,00" is cleared out of the cross footer CT in which operation the same mechanisms are actuated as in the clearing of the foregoing "0" in the thousands denomination of the value "30750,00." The card 489 is perforated as at 501 (Fig. 22) which corresponds exactly to the perforation 498 only that it is punched on the card 489 in a position displaced by the corresponding number of carriage steps that is to say, the two perforations 501 representing zero are spaced apart horizontally exactly the same distance as are the perforations 498 representing the zero of higher denomination, but the pair of perforations 501 are located three steps to the right of their corresponding perforations 498, respectively.

And it will be noted that the perforations 501 and 498 although representing the same character, in the same amount, are relatively interspersed. The carriage 140, after the "0" is typed in the column VI of the card 489, escapes to the comma position of the value "30750,00" of the column VI of the card 489 in the typing position, but this position is skipped by the comma-skipping mechanism described in the section "comma-skipping device." No punching is effected in the punctuation or comma position on the card 489. After this, the two "0's" after the comma punctuation point are cleared from the cross footer CT, whereby the same mechanisms are actuated as in the case of the zeros already cleared from the cross footer CT. The paper carriage 140 is moved two steps farther to the left, while the two zeros after the comma of the value "30750,00" are typed in the column VI of the card 489 and the card is twice perforated, as at 502 and 503. The punchings 502 and 503 corresponding exactly to the punchings 498 and 501, only that these are punched in the card 489 at corresponding carriage step distances apart. As soon as the last digit of the value "30750,00" is cleared from the cross footer CT, the total-taking control key 1 is automatically released in the manner described under the title "Total-taking," whereby the switch 508 and 509 (Fig. 26), is automatically opened. The opening of the switch 508, 509 after completion of the total taking is necessary, since in the rest position of the contact-carrying arm 514 the contact pins 520 corresponding to the digit "0" are constantly in connection with the corresponding contact fingers 521 and 522. In the event of the switch 508, 509 remaining closed after total-taking has been completed, the punching pins 374 and 375 would be continually operated, since the contact C32 is constantly opened and closed alternately by the continuously rotating shaft 22. It would be possible therefore, if the switch 508, 509 were not opened, for a punching to be punched on the card 489 corresponding to the digit "0" that does not correspond to the value "30750,00" cleared by total-taking from the cross footer CT, so that therefore in the testing later described under the title "Sensing mechanism" of the punched value, errors would arise. Since, as hereinbefore described, the perforator carriage 319, 320 was locked by the arresting dog 476 and the tooth 504 against farther advance on the arrival of the paper carriage 140 with the column VI of the card 489 in typing position or at the beginning of the total-taking operation, the spring 350 (Fig. 12) has been tensioned in the continued advance of the paper carriage movement to the left, during the total-taking, whereby the card 489 following the movement of the paper carriage 140 has moved freely to the left in the slot 323 of the arrested perforator carriage 319, 320. The spring 350 is progressively compressed between the collar fast on the cross rod 317 and the bracket arm 342 of the arrested perforator and sensing carriage 319, 320 as the paper carriage 140, of which cross rod 317 forms a part, advances step by step to the left in the typing of the total amount in column VI. The paper carriage 140 is now manually returned to its extreme right-hand position. In the first part of this movement of the paper carriage to the right the perforator carriage 319, 320 is prevented from accompanying the paper carriage by the still tensioned spring 350, until the loose collar 347 associated with the opposing spring 349 contacts the bracket arm 472, whereupon the perforator-sensing carriage is forced by the spring-bolstered collar 347 to accompany the paper carriage 140 as the latter returns into its initial position which forms its rest position. During the time when the paper carriage 140 is returning relatively to the perforator and sensing carriage 319, 320, the record sheet 489 inserted in the paper carriage 140 travels to the right in the slot 323 of the perforator, and takes up the position illustrated in Figs. 1 and 18. In the farther combined movement of the paper carriage and the perforator and sensing carriage to the right the stop pawl 474 moves away from the stop tooth 504 and ratchets over the teeth 730, 722, 731 (Fig. 13). Shortly before the termination of the carriage movement to the right the perforator carriage 319, 320 is prevented from moving farther to the right by contact of its hanger 471 (Fig. 28) against the stop 477 fixed to the machine frame 302, whilst the paper carriage travels farther for one or more carriage steps (a distance t, Figs. 13 and 16), to its extreme right-hand position. The spring 349 is thereby tensioned, while the card 489 travels to the right freely for the distance t in the slot 323 of the perforator carriage 319, 320. The perforator carriage 319, 320 and the paper carriage 140 together with the card 489 now occupy the position shown in Fig. 13, in which the contact C30 is in connection with the contact rail C31. In this position the card 489 is located with the extreme left-hand hole of the punchings 497 to 503 (Fig. 22) at the distance t (Figs. 17 and 22) to the right of the punching pin 374. Now, if in this position the switches 508 and 534 (Fig. 25) are actuated, the switch 508 of course independently by the manually operable total key lever 3, the following circuit is closed: from the source 532 to the manually closed total key controlled switch 508, 509, thence through the carriage controlled contacts C31, C30 (the carriage being at its right hand limit of travel Fig. 13) to the magnet coil 361 operating the punch 374 for punching perforations representing the digit "1," and to the magnet coil 428 (see also Figs. 6 and 15) for operating a punch which perforates test holes in the right hand margin of the record sheet. The magnet coils 361 and 428 are energized, whereby their cores 357 and 429 are attracted to the supporting members 353 and 425, and rock counter-clockwise on their pivots 365 and 430. They thereby act with their ends 370 (Fig. 5) and 431 (Fig. 6) on the punching pins 374 and 432 (Figs. 1, 5 and 6) and push these through the card 489 against the tensions of their springs 378 and 434, whereby a further punching 535 (Fig. 22) is effected, which consists of one hole each on the two sides of the card at the edges or margins thereof. These marginal perforations 535 (Figs. 17 and 22) are formed in exact alinement with the value-representing holes 407 to 503, and correspond in regard to the distance between their two holes, with the distance between the sensing pins 448, 455 (Fig. 4) which as hereinafter described serve as line finders and determine the position of the card upon its insertion with relation to the printing and perforating mechanisms as well as its relation to the sensing mechanism for controlling the printing mechanism. The arrest of the perforator carriage before the paper carriage 140 arrives in its extreme right-hand position, according to the foregoing, enables the utilization of the extreme left hand punch 374 hitherto employed in forming value representing perforations, to also form the left hand marginal locating hole 535 in the record sheet 489. Hence the punch 374 performs dual operations.

After the circuit is interrupted by the opening of the switches 508 and 534 (Fig. 25) and the perforating punches 374 (Fig. 5) and 432 (Fig. 6) with their associated parts return to normal position under the influence of the springs 378 and 434, the card 489 is taken out of the machine. This is effected as in the introduction of the card 489, by corresponding rotation of the platen 152 and by way of the platen-shaft operated gear train 482, 483, 486, (Fig. 5) and the forwarding rollers 480 and 481. After the removal of the card 489 the same is laid aside for the purpose of effecting the next entry.

*Sensing mechanism*

Figures 9, 10, 11:
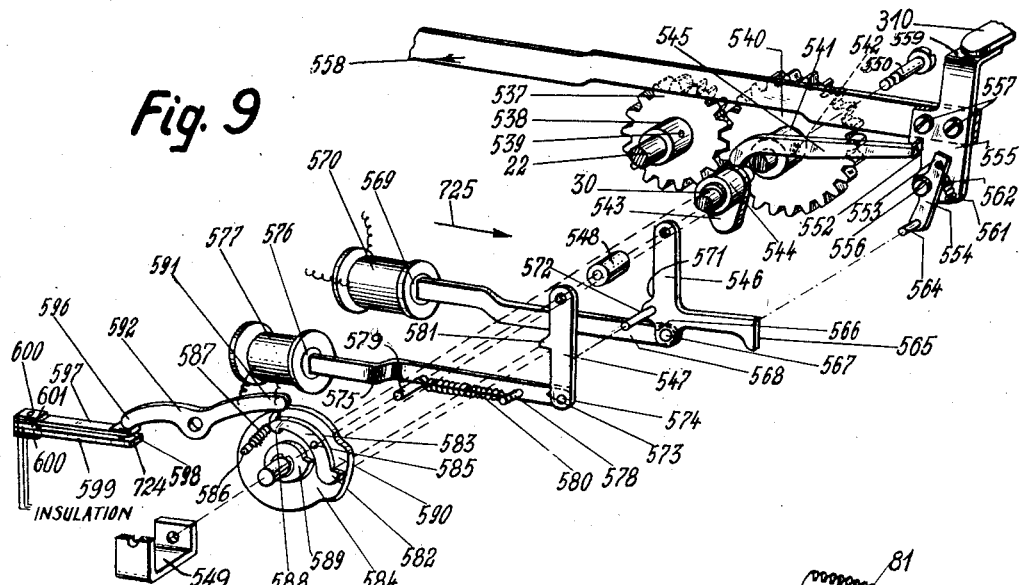
Fig. 9 shows a perspective elevation of further control elements of the subject of the invention likewise seen from the left-hand in front of the machine in which view for better illustration individual parts are illustrated separated from one another.
Fig. 10 shows a detail according to Fig. 9, in section.
Fig. 11 shows further control parts of the present mechanism viewed in perspective elevation from the left-hand in front of the machine.

The shaft 22 (Figs. 3 and 9), is extended to the left, and at the left-hand side is mounted in bearings in the left side frame 536 of the machine frame 302. On the shaft 22, a toothed wheel 537 is secured by a pin 539 through its boss 538. The toothed wheel 537 is in engagement with a toothed wheel 540, which by means of its boss 541 and a pin 542, is fixed on a shaft 30. On the shaft 30 which constantly rotates, a cam 543 is loosely mounted by means of its boss 544, and is capable of acting on a lever 545. The lever 545 together with two further levers 546 and 547, held at the necessary distance in relation to each other by a distance ring 548 (Fig. 1) are pivotally mounted on a headed screw 550 screwed into a fixing angle 549 (Figs. 1 and 9). The fixing angle 549 is secured at 551 to the inner side of the supporting frame 536. The lever 545 (Figs. 3 and 9) is capable of acting with its bent portion 552 on an arm 553 of a lever 554 pivotally mounted at 556 on the lower end of the left-hand leg 555 supporting the usual space bar 310. The leg is secured intermediate its ends at 557 to the left-hand space key lever 558, while its bent portion 559 is fixed to the space key 310. By means of a spring 562, one end of which is attached to the arm 553 of the lever 554, and its opposite end to a spring connecting pin 561 fixed in the leg 555, the lever 554 is constantly acted on in the clock-wise direction around its pivot 556, whereby its pin 564 riveted to its lower arm contacts with an arm 565 of the lever 546 already described, and thereby limits the swinging movement of the lever 554. The lever 546 is articulately jointed at its end 566 to a connecting rod 568 by means of a rivet 567, the connecting rod being combined with a core 569 of a magnet coil 570 to form a single unit. By means of a pin 572 riveted into its eye 571 the lever 546 is capable of acting on the lever 547. At its lower end 573 the lever 547 is articulately jointed by means of a rivet 574 to a connecting rod 575, which is combined with a core 576 of a magnet coil 577 to form a single unit. A spring 580 connected to a pin 578, fixed to the connecting rod 575, and to a pin 579 fast on the frame, rocks the lever 547 to position its locking nose 581 into locking relation with the nose 582 (Figs. 3 and 9) of a locking pawl 583, whereby the pawl is held in its rest position. The pawl 583 (Figs. 9 and 10) is pivotally mounted at 585, on a disc-cam 584. The disc-cam 584 is fixed to the boss 544 of the cam 543 already described and is similarly loosely rotatable on the shaft 30. A spring 587 connected to the locking pawl 583 and to a pin 586 (Fig. 9) riveted into the disc-cam 584, is capable of holding the locking pawl 583 with its nose 582 in locking relation to the nose 581 of the lever 547, or of bringing the nose 588 of the disc-cam 584 into driving connection with a cam 589 (Figs. 9 and 10) fixed on the shaft 30. The disc-cam 584, the boss 544 and the cam 543 form, as is evident from Fig. 10, a unit which is held against axial displacement by the cam 589 and the boss 541 of the toothed wheel 540. When the disc-cam 584 is driven its curved projecting surface 590 acts on an arm 591 of a lever 592. The lever 592 (Figs. 1, 3 and 9) is pivotally mounted at 593, to a bracket 594 (Fig. 1) fastened at 595 to the inner side of its supporting frame 536. The arm 596 (Fig. 9) of the lever 592 is capable of depressing on a contact spring 597, and at the contacting position of both these parts, an insulator member 598 is fixed on the contact spring 597. In conjunction with insulator members 600 and 601 (Figs. 3 and 9) contact springs 597 and 599 are secured at 602 (Fig. 1) to a connecting bridge 603 of the supporting frame 536, whereby a contact 724 (Fig. 9) is formed. The magnet coils 570 and 577 are fastened on a plate 605 (Figs. 1 and 3) secured to the connecting bridge 603 of the supporting frame 536 at 606.

Figure 25:
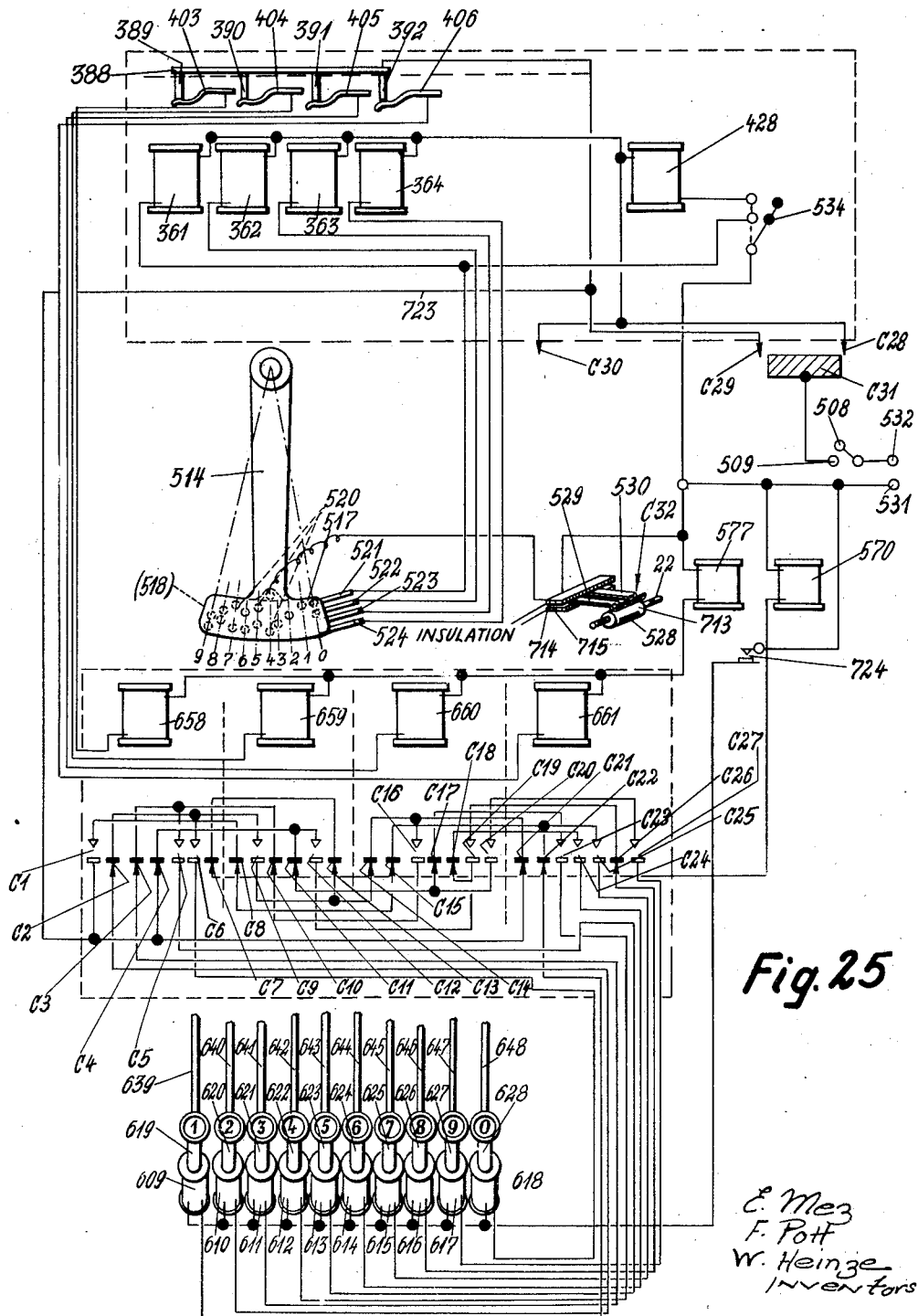
Fig. 25 shows a circuit diagram in relation to the control elements for the mechanism according to the invention.

An angle bar 607 (Figs. 1 and 3) secured at 608, to the forward face of the sub-frame and beneath the calculating keys 198, carries ten magnet coils 609 to 618, Figs. 3 and 25. The cores 619 to 628 of the coils 609 to 618 are articulately jointed at 629 to 638 (Fig. 3) to the calculating key levers 639 to 648 of the calculating keys 198.

To the base flange 656 (Fig. 3) of the sub-frame 536 on which the typewriting-calculating machine is supported, two angle members 649 are rigidly mounted at 650, one on the left-hand and one on the right-hand inner side (in Fig. 3 only the right-hand member is visible). On these two angle members a bar 651 formed of insulating material is rigidly mounted by means of screws, not illustrated. The bar 652 formed of insulating material is likewise fastened by means of screws, not illustrated, to angle pieces 654 rigidly mounted, one on the left-hand and one on the right side of the supporting frame 536 at 653. A bar 655 extends across the machine between the flanges 656 of the right and left-hand side walls, respectively, of the supporting frame 536 of the machine. To this bar 655, further, an angle piece 662 is fixed at 657, on which angle piece the magnet coils 658, 659, 660, 661 are rigidly mounted.

A number of contacts, for example, C1 to C27 (Fig. 25) some of which are opened and some closed, under control of the magnet coils 658, 659, 660, 661 for a purpose to be hereinafter described, are distributed in four groups for this purpose. The first group consists of the contacts C1 to C7, controlled by the coil 658. The second group of contacts C8 to C13, controlled by the coil 659. The contacts C14 to C20 form the third group under control of the coil 660. The fourth group consists of the contacts C21 to C27, controlled by the coil 661. In Figs. 7 and 8 the magnet 658 is illustrated with its contact group.

The leg 663 of the U-shaped magnet core 664 projects through the magnet coil 658. An armature 665 is pivoted at 666 in the slotted outer end of the leg 663 of the U-shaped magnet. Angular fixtures 667, 668 secured at 669 to the upper free end of the armature 665 support on their flanged ends 670 and 671 a contact control bar 672 of insulated material. The bar is secured to the flanged fixtures at 673 and 674, and lies in the space between two opposed rows of spring contacts on the parallel insulated supporting bars 651 and 652.

The longitudinal edges of the insulated contact control bar 672 are beveled or wedge-shaped in cross-section to make and break the two series of contacts 675–682 and 695–700, alternately. The series of spring contacts are arranged as follows: On both sides of the insulated supporting bar 651, spring fingers 675 to 682 are fixed at 683 to 686, and with their points 687 to 694 form the contacts C2, C3, C4 and C7 (Fig. 25). The similar insulated contact supporting bar 652 arranged parallel with the insulated bar 651, carries the pairs of spring contact fingers 695–700 (Figs. 7 and 8) secured to the bar at 701 to 703, which fingers with their contact points 704–709 constitute the series of contacts C1, C5 and C6, shown in Fig. 25, which oppose the series of contacts C2, C3, C4 and C7, with the contact control bar 672 extending between the free ends of the two series of spring fingers. A spring 711 (Fig. 7) anchored at 710 draws the armature 665 and its contact control bar 672 clockwise until the armature is arrested by contact with the stop 712, which determines the normal position of the parts. In such position, the appropriate beveled edge of the insulated bar 672 is inserted between the contact points 704 to 709, so that the contacts C1, C5 and C6 are opened, whilst the contacts C2, C3, C4 and C7 are not acted upon by the bar 672 and remain closed.

The magnet coils 659, 660 and 661 (Fig. 25) and the contacts C8 to C27 are arranged in the same manner as the magnet coil 658 and the contacts C1 to C7, respectively, for which reason these are not illustrated separately, and in the description will not be described in greater detail.

A further contact C32 is formed by a contact plate 528 (Figs. 1 and 25) which is arranged on a ring 713 of insulating material pressed on to the shaft 22 and which co-acts with two contact springs 529 and 530 clamped between two insulator plates 714 and 715 fastened at 716 to the bridge 603 of the supporting sub-frame 536. The individual electrical control elements hereinbefore described are supplied from an electrical source of current 532, 531 (Fig. 25) in the necessary manner and sequence for the working operations of the present mechanism over the network of wires represented diagrammatically in Fig. 25, after the circuits have been closed by way of switches 508 and 534.

*Method of operation of the sensing mechanism*

Before the card 489 is introduced anew for the registration of the next entry into the perforator carriage 319, 320, the perforator carriage must first be brought back into its initial position which forms the rest position. To this end the paper carriage for example by operation of a corresponding tabulator key is first of all moved again to the left through at least a distance corresponding to the distance *t* (Figs. 13, 17 and 22). The perforator carriage stop 471 is thereby withdrawn from the fixed stop 477 (Fig. 13) so that the perforator carriage 319, 320 influenced by the compression of spring 349, is returned to its initial position. This carriage movement to the left is more advantageously effected before the removal of the card after the completion of a booking operation, since this ensures that the perforator carriage 319, 320, on the introduction of the card 489 for a further booking operation, will be located in the correct position. The card 489 is then introduced again for the next booking into the slot 323 of the perforator carriage 319, 320, whereby it falls with its lower edge between the forwarding rollers 480 and 481. Now the actuating lever 464 (Figs. 1 and 4) is rocked forwardly in the arrow direction 718, to release or cast off the paper feeding rollers 490 and 491, whereby the connecting member 466 is moved and with it the parts 460, 463, 457, 444, 451 and 445 by way of the pin 470. The sensing pins 455 and 448 are thereby first displaced in the arrow direction 719 (Figs. 4 and 6) until they are pressed against the inserted card 489, after which continued rocking of the feed roll cast-off lever 460 tensions the spring 463. Then, the operator manually rotates the platen 152 to cause the card 489 to be gripped by the forwarding rollers 480 and 481 and drawn into the machine in the arrow direction 493 (Figs. 3 and 5), whereby its lower edge is led by an additional guide plate, not illustrated, into the paper throat between the forward end of the paper apron 494 and the platen 152, by which it is guided. The forwarding movement of the card 489 in the arrow direction 493 is arrested upon the registration of the marginal line finding holes 535 (Figs. 17 and 22) with the spring-pressed sensing pins 448 and 455, so that the latter are moved in the arrow direction 719 through the holes 535 of the card 489 into the alined seats in the carriage guide bar 319 in the perforator. In this position the card 489 and the forwarding rollers 480 and 481 are stopped, the friction drive provided preventing the card holes from being torn out even if the platen 152 is farther turned after the card 489 has already been arrested by the sensing pins 448 and 455. After the card 489 is stopped by the pins 448 and 455 in the typing position, the paper feeding rolls are restored to their operative positions by actuation of the lever 464 in the opposite direction of the arrow 718 (Fig. 4), and the sensing pins 448 and 455 are moved back into their initial position to withdraw them from the marginal line finding holes 535 of the card 489.

Since the sensing pins 448 and 455 lie in the same horizontal plane with the testing pins 389 to 392 and marginal line finding holes 535 with which the sensing pins co-act, lie in horizontal alignment with the digit-representing perforations 497 to 503, therefore, the perforations 497 to 503 lie at the level of the testing pins 389 to 392. Since however, on the other hand, the sensing pins 448 and 455 and the testing pins 389 to 392 lie in a position higher by the distance of one line than the punching pins 374 to 377, the card 489 is inserted less deeply in the arrow direction 493 (Fig. 18) by the distance 721 of a line (Fig. 32), so that now the line indicated by the reference numeral 722 (Fig. 17) lies at the typing position.

To commence with, the account number, date, and text of the entry is again typed by means of the typing keys 209. The paper carriage 140 is then shifted to locate column I of the card 489 to the typing position by operation of the corresponding tabulator key 185. The value 750.00 is first typed by means of the calculating keys 198 in the column I of the card 489 as a debit value, and simultaneously registered in the corresponding totalizer T1. This value is transmitted into the cross footer CT, but since the state control cam 50 (Fig. 3) of the active column totalizer T1 has been adjusted to set the calculating mechanism of the cross footer totalizer CT to subtract, the amount "750.00" is entered in the cross footer subtractively. It now becomes necessary to enter in column IV as a credit the amount "30750.00" previously listed in the New balance column VI, and enter it additively in the corresponding column totalizer T4 and in the cross footer totalizer CT. This is effected automatically by sensing the digit-representing perforations 497 to 503 formed in the record medium 489 coincidently with the previous entry of such amount in the New balance column.

To these ends, the paper carriage 140 is tabulated to locate the highest denominational space in column "IV" at the printing point, which incidentally positions the totalizer wheel of highest denomination of column totalizer T4 at the calculating zone in mesh with its master wheel, and positions the corresponding totalizer wheel of the cross footer totalizer CT in mesh with its master wheel.

Figure 20:
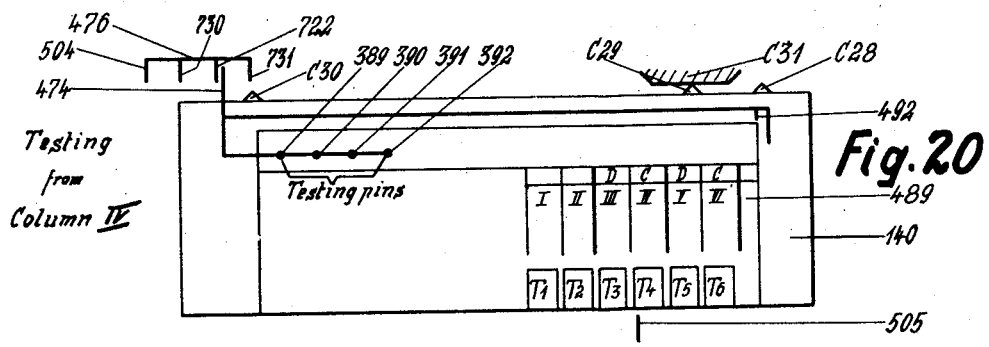

At this time, the relative positions of the perforator carriage, 319, 320, with its sensing pins, and the paper carriage 140, with its contacts is as shown in Fig. 20, in which the traveling contact point C29 has come into contact with the fixed contact C31. In this position the pawl 474 of the perforator carriage 319 to 320 is brought into engagement with the projection 722 of the stop 476, whereby the perforator carriage 319, 320 is held stationary, and the paper carriage 140 together with the totalizers T1 to T6 and the account sheet 489 alone are moved farther to the left. The value "30750,00" as described in the following is now sensed denomination by denomination automatically, and registered additively in the corresponding totalizer T4 and in the cross footer CT, and typed in the column IV as the Old Balance. The sensing of the value "30750,00" is effected according to the perforations 497—503, by means of the four testing pins 389 to 392, which come into operation for this purpose singly or in combinations of two of testing pins according to the code in Fig. 24. In order that the magnet coils 609 to 618 operating the calculating keys 198 for the numbers "0" to "9" can be actuated severally and in the correct sequence by the four testing pins 389 to 392, the latter selectively influence first the four magnet coils 658 to 681 singly or in combinations of two, which, on their part control the contacts C1 to C27, subdivided into four groups. Due to the alternation of the insulated contact control bar 672 (Figs. 7 and 8), between the groups into which the contacts C1—C27 (Fig. 25) have been arranged and the consequent opening and closing of the contacts, only a single coil of the numeral key-actuating magnet coils 609—618 (Figs. 3 and 25) corresponding to the digit represented by the digit representing perforations is energized at a time, as the digit perforations are sensed by the sensing pins.

It being recalled that the paper carriage 149 has been advanced to locate the highest denominational space of the Old credit balance column IV at the printing position, the card 489 lies with the digit-representing perforation 497 (Fig. 23) corresponding to the first digit "3" of the value "30750,00" opposite to the testing pin 391. Accordingly the latter moves through the hole and consequently contacts with the conducting bar 388 (Fig. 5). Now, the switch 508 having been closed the sensing operation continues automatically. The current passes from its incoming lead 532 by way of the switch 508, to the contacts C31, C29, and along the conductor bar 388 and sensing pin 391 to spring 405, magnet coils 660 and 577 to the outgoing lead 531 (Fig. 25). The magnet coils 660 and 577 obtain current. The magnet coil 660 thereby acts in the manner hereinbefore described for the magnet coil 658 to effect the switching over of the contact group C14 to C20 associated with it. The contacts C14, C15, C17 and C18, which are closed in the rest position, are thereby normally open, and the opened contacts C16, C19 and C20 are closed. The circuit now takes the following path: from the incoming lead 532, through switch 508, contacts C31, C29, lead wire 723, spring contacts C21 (of the normally closed adjacent group unaffected by the magnet 660) and C16 (closed by the magnet 660), normally closed spring contacts C10 and C3 of adjacent groups (unaffected by the magnet 660) and calculating key actuating magnet 611 to the contact switch 724 (see also Fig. 9). By the excitation of the magnet coil 577 in the sensing operation, the connecting rod 575 (Fig. 24) is projected in the direction of the arrow 725 to tension the spring 580, and to disengage the tooth 581 of the clutch detent 547 from the tail 582 of the coupling pawl 583. Thereupon, the spring 587 rocks the coupling pawl counter-clockwise on its pivot 585 (Figs. 9 and 10) on the disc-cam 584, to connect the cam with the rotating fluted drive shaft 30. The disc-cam 584 now participates in the rotational movement of the shaft 30 in the anti-clockwise direction and acts after a part, for example, a third of a revolution, to rock the lever 592 counter-clockwise, causing said lever to close the spring contact 597, 724. The elapsed time enables the starting magnet 660 to come to rest, thus avoiding the making of improper contacts. The contact 724 closes the circuit finally, so that the magnet coil 611 obtains current by way of 531. The core 621 of the calculating key actuating magnet coil 611 is thereby attracted and consequently the calculating key lever 641 corresponding to the calculating key 198 of the "3" is drawn down.

The digit "3" of the value "30750,00" is thereby registered in the corresponding totalizer T4, and is transmitted additively into the cross footer CT corresponding to the setting of its pre-set state control cam 50, and is simultaneously typed in the column IV of the card 489.

In the carriage movement to the left for one step which thereby results and in which the perforator carriage does not participate, the card 489 in the slot 323 of the perforator carriage 319, 320 travels with the paper carriage. The connection of the contact pin 391 with the bus bar 388 is thereby interrupted by the interposition of an imperforate portion of the card 489, which breaks the flow of current to the magnet coils 660 and 577. Accordingly, the spring 711, Fig. 7, restores the insulated contact control bar 672 to its normal position to restore the contacts C14 to C20 into their initial positions, wherein the contact C16 is open, and the magnet coil 611 is deenergized. The calculating key lever 641 is returned to its rest position by its spring, not illustrated, whereby the calculating and typewriting operations are completed. The magnet coil 577 (Figs. 9 and 25) is also without current, and the clutch tripping connecting rod 575 under the action of the spring 580 is shifted in the opposite direction to the arrow 725 (Fig. 9) into the initial position. The clutch disabling detent 547 thereby moves so that its nose 581 is again within the range of the tail 582 of the coupling pawl 583. At the end of the rotation of the shaft 30, the coupling 583, 589 is thereby released, so that the lever 592 is no longer operative. All the foregoing mechanisms which were actuated have therefore returned into the rest position again.

After the termination of the carriage step which is effected at this point, the card 489 is positioned with the digit representing perforations 498 (Fig. 23) corresponding to the next digit "0," of the amount "30750,00" opposite to the testing pins 389, 390, so that the latter move into contact with the bus bar 388 through the perforations. The following circuit is thereby closed: 532 (Fig. 25) 508, C31, C29, 388, 390, 404 and 388, 389, 403, magnet coils 659 and 658 and 577, 531. The magnet coils 658, 659 effect in the manner hereinafter described the switching-over of the contact groups C1 to C7 and C8 to C13. By means of the current which flows through the coil 658 (Figs. 7 and 8) the part 664 becomes magnetic and attracts the armature 665 so that the latter with the beveled edged insulated contact control bar 672 are swung against the action of the spring 711 in the anticlockwise direction. The bar 672 thereby frees the contact members 704 to 709, so that the contacts C1, C5 and C6 are closed by the action of the springs 695 to 700 and separates the contact fingers 687 to 694 against the action of the springs 675 to 682 to open the contacts C2, C3, C4 and C7. In the manner just described, the contacts C8 to C13 are also switched-over by means of the magnet coil 659

(Fig. 25) whereby the contacts C8, C10, C11 and C13 are opened, and the contacts C9 and C12 closed. Also, the switching-over of the contacts C14 to C20 hereinbefore described, by means of the magnet coil 660, and the switching-over of the contacts 621 to 627 by means of the magnet coil 661 results exactly in the manner hereinbefore described for the coil 658 and the contacts C1 to C7, for which reason it has only been described for this group and illustrated. The circuit takes the following path, after switching-over the contacts C1 to C13 by the magnet coils 658 and 659: 532, 508, C31, C29, 723, C21, C14, C9, closed by the magnet coil 659, C6, closed by the magnet coil 658, magnet coil 618, up to contact 724. Since, as above mentioned, the magnet coil 577 is excited again in this case, the contact 724 has again been closed in the manner already described. With this the circuit is again definitely closed, and the magnet coil 618 obtains current by way of 531. The core 628 of the magnet coil 618 is thereby attracted, and draws down the calculating key lever 648 corresponding to the calculating key 198 of the digit "0." Since in the actuation of the calculating key for the digit "0" no calculating operation results, the number "0" is only printed in the column IV of the card 489. The paper carriage 140 with the card 489 thereby escapes another step to the left. Since the card 489 is thereby moved again between the testing pins 389 and 390, and the bus bar 380, these contacts are opened and the magnet coils 658 and 659 as well as 577 are without current. Accordingly, the armature 665 of the magnet coil 658 (Figs. 7 and 8) and the contact controlling insulated bar 672 are restored by the spring 711, into their initial positions as determined by contact of the armature 665 with the stop pin 712. The contact control bar 672, by its return to normal, opens the contacts C1, C5 and C6, and allows the remaining contacts C2, C3, C4 and C7, of its group to close. In the same manner the contacts C8 to C13 have also been returned to their rest position. Since the contacts C9 and C6 were thereby opened again, the magnet coil 618 has been de-energized, so that the calculating key lever 648 returns into its initial position under the action of its spring. Since the magnet coil 577 also is again without current, the contact 724 remains also open in the manner already described. All the operative mechanisms in the sensing operation have therefore again returned into the initial position.

Now, after the next carriage step has been effected the card 489 stands with the digit representing perforations 499 (Fig. 23) corresponding to the next digit "7" of the value "30750,00" opposite to the testing pins 389 and 392, so that these pins may be projected through such perforations to make contact with the bus bar 388. The circuit 532 (Fig. 25) 508, C31, C29, 388, 392, 406 and 388, 389, 403, magnet coils 661, 658 and 577, 531, is thereby formed, whereby the magnet coils 658, 661, as well as 577 are excited. The magnet coil 658 effects in the manner hereinbefore described the re-conditioning of the contact group C1 to C7, whereby the contacts C1, C5 and C6 are closed and the contacts C2, C3, C4 and C7 are opened, while the magnet coil 661 conditions the contact group C21 to C27, whereby the contacts C23, C24, C25 and C27 are closed, and the contacts, C21, C22 and C26 are opened. The circuit now takes the following path: 532, 508, C31, C29, 723, C1 (closed by the magnet coil 658) C8, C15, C25 (closed by the magnet coil 661) magnet coil 615, up to the contact 724. Now, since the contact 724 was also closed in the manner above described by the disc-cam 584 controlled by the magnet coil 577 the circuit is closed, so that the magnet coil 615 obtains current by way of 531. The core 625 of the magnet coil 615 is thereby attracted and with the latter the key lever 645 corresponding to the calculating key "7" is drawn down. In the calculating process which thereby follows, the digit "7" of the value "30750,00" is registered in the column totalizer T4, and, in consequence of the setting of the state-control cam 50 appertinent to the column totalizer T4, for "addition," is also transmitted additively to the cross footer CT. After the simultaneous printing of the digit "7" in the column IV of the card 489 is effected, a further carriage step to the left takes place. The contact between the sensing pins 389 and 392 with the bus bar 388 is broken whereupon the mechanisms actuated in the sensing operation previously carried out restore to their normal positions again in the manner already described.

On the completion of the carriage step which follows as an incident to the printing of the digit 7, the paper carriage stands with the digit representing perforations 500 (Fig. 23) of the card 489, corresponding to the next number "5" of the value "30750,00" opposite to the testing pins 389 and 391. The testing pins 389 and 391 thereby make contact through said perforations 500, with the bus bar 388, and thereby close the following circuit: 532 (Fig. 25), 508, C31, C29, 388, 391, 405, and 388, 389, 403, magnet coils 660 and 658, and 577, 531, whereby the coils 658 and 660 as well as 577 are energized. The magnet coil 658 thereby causes the contact control bar 672 to rock from its normal position, to close the contacts C1, C5 and C6 and open the contacts C2, C3, C4 and C7, whilst the magnet coil 660, through its individual contact control bar, conditions the contact group C14 to C20, whereby the contacts C16, C19 and C20 are closed. The circuit now takes the following path: 532, 508, C31, C29, 723, C21, C16 (closed by magnet coil 660) C10, C5 (closed by magnet coil 658), magnet coil 613 up to contact 724. After the contact 724 is closed by the disc-cam 584 controlled by the magnet coil 577, the circuit is closed and the magnet coil 613 obtains current from 531. The core 623 of the magnet coil 613 is thereby attracted and therewith the calculating key lever 643 corresponding to the calculating key of the digit "5" is drawn down. By the ensuing calculating operation the digit "5" of the value "30750,00" is registered in known manner in the totalizer T4, and transmitted to the cross footer CT, whilst it is simultaneously typed in the column IV of the card 489. After the typing of the digit "5" has taken place, the paper carriage 140 escapes one step to the left, during which the contact of the sensing pins 391, 389 with the bus bar 388 is broken, and the mechanisms actuated in the previously effected sensing operation return into their initial positions in the manner already described.

After the carriage step has been completed, the carriage is located with the digit-representing perforations 501 (Fig. 23) of the card 489 corresponding to the next digit "0" of the value "30750,00" opposite to the testing pins 389 and 390. The sensing operation hereby effected is exactly the same as occurred with the first digit "0" of the value "30750,00" for which reason it will not be further described here. On completion of the carriage step occurring incident to this operation, the paper carriage 140 with the card 489 stands with the comma or punctuation place of the value "30750,00" in the calculating position. Since the card 489 does not show any value representing perforation in this position and consequently no contact-making connection of the testing pins 389 to 392 with the bus bar 388 is produced, no sensing and calculating operations can result in this position of the carriage. In order to bring the paper carriage 140 into the position for the next sensing operation so that the next lower denomination of the value "30750,00" will be in the calculating position, the space key is actuated as follows:

Through the circuit 532 (Fig. 25) 508, C31, C29, 723, C21, C14, C13, C7, 570, 531 closed in this position of the paper carriage 140, the magnet coil 570 (Fig. 9) is energized so that its coil core 569 is attracted and the connecting rod 568 is projected in the arrow direction 725. The articulately jointed bell crank 546 is thereby swung in an anti-clockwise direction round its pivotal connection 567 with the connecting rod, to cause its arm 565 thrusts against the pin 564 and swings the lever 554 in the anti-clockwise direction round its pivot 556 and against the action of the spring 562. The lever 554 in this position lies under the off-set lug 552 (Fig. 9) of the lever 545. Further, the pin 572 of the bell crank 546 acts in this swinging movement on the clutch pawl detent 547, and swings the latter likewise in the anti-clockwise direction round its pivot, whereby, the articulately jointed connecting rod 575 is drawn forwardly in the arrow direction 725, against the action of the spring 580, without, however, influencing thereby any further part. In the swinging of the clutch pawl detent 547, its nose 581 is withdrawn from the tail 582 of the coupling or clutch pawl 583, whereupon the tensioned spring 587 rocks the clutch pawl into driving connection with the cam 589 of the shaft 30. The disc-cam 584 participates in the succeeding revolution of the shaft 30 and after, for instance, a third of this revolution, the disc-cam rocks the contact lever 592 and closes the contact 724. This is an idle operation no further mechanisms being actuated and no further circuits being closed. However, the eccentric 543 fast on the drive shaft 30 with the disc-cam 584, and turning therewith, operates, during the first half of its revolution to rock the lever 545 in a clockwise direction on its pivot 550 and press its offset lug 552 against the upper end of the interposed lever 554, which as above described, was brought into the working position in relation to the offset lug 552 of the lever 545. The space key 310 and its space key lever 558 are thereby drawn down to trip the escapement so that the paper carriage 140 is released for a further movement of one step towards the left. During the drawing down of the space key 130, the pin 564 slides along on the arm 565 of the bell crank 546, and thereby holds the interposed lever 554 in the operative position in relation to the eccentric-operated lever 545.

After the termination of the carriage step which occurred in moving from the comma position into the next lower denomination, the paper carriage 140 stands with the digit representing perforations 502 (Fig. 23) of the card 489 corresponding to the following digit "0" of the value "30750" opposite to the testing pins 389 and 390, whereby the same sensing operation occurs as in the previous digits "0" of the value "30750,00" for which reason it is unnecessary to repeat the description thereof. Since the contact groups C1 to C7 and C8 to C13 are conditioned as previously explained in the sensing of the digit perforations representing "0" that is, the contacts C13 and C7 are opened, the circuit 532 (Fig. 25) 508, C31, C29, 723, C21, C14, C13, C7, 570, 531 is first interrupted, and the magnet coil 570 is deenergized, so that the parts interposed lever 554 (Fig. 24), the bell crank 546 and the connecting rod 568 return into their initial positions under the action of the spring 562, in which the interposed lever 554 is located out of the operative relation in relation to the lever 545. But the clutch pawl detent 547 and its connecting rod 575 are held in their operated positions, because due to the instant sensing operation of the "0" digit-representing perforations, as hereinbefore described, the magnet coil 577 is excited and hence, its core 576 and connecting rod 575 remain projected, or are immediately re-projected, and the bell crank 546 remains in its operated position, or is immediately rocked to its operated position, to retain the clutch pawl detent 547 idle and permit the clutch pawl 583 to remain engaged with the drive shaft 30, to again impart a complete revolution to the disc-cam 584 and the eccentric 543. The eccentric again rocks the space key trip lever 545, but this movement is idle because of the return of the interposed lever 554 to its normal ineffective position.

The disc-cam 584, however, operates the lever 592 to close the contact 724 and complete the circuit.

Now after the digit "0" has been printed, the paper carriage shifts to the left one step to locate the digit-representing perforations 503 (Fig. 23), corresponding to the next and units digit "0" of the value "30750,00" opposite to the testing pins 389 and 390, whereby the same sensing operation is effected again as in the sensing of the previously sensed digits "0" of the value of "30750,00." After the units digit "0" of the value "30750,00" has been typed in the corresponding column IV of the card 489 and the paper carriage has escaped one step to the left, the whole sensing process ceases, according to which the whole number "30750,00" is registered in the corresponding totalizer T4, transmitted into the cross footer CT and simultaneously typed in the column IV of the card 489.

After the carriage step which took place on the last sensing operation, the switch 508, 509 (Fig. 25) is opened by hand, and the locking pawl 474 (Figs. 27–31) is manually disengaged from the tooth 722 of the stop 476, whereby the perforator carriage urged by the strained spring 350 returns into its initial position. By operating the corresponding tabulator key 185 the paper carriage 140 is now brought with the column VI into the typing position.

Now by operation of the total taking control key, the value "30000,00" which is the new balance calculated in the cross footer as a result of subtracting the amount "750,00" from "30750,00," is cleared out of cross footer automatically denomination by denomination in the manner described under the title: "Total-taking," and transmitted to the corresponding totalizer T6, and is printed simultaneously in the corresponding column VI of the card 489. The value "30000,00" is also automatically punched denomination by denomination on the card 489 in the manner already described for the value "30750,00," so that the straight horizontal one-high line of amount-representing perforations 728 (Fig. 17) is formed at the distance of one line space beneath the straight horizontal one-high line of perforations representing the amount "30750,00." Then after the completion of the total-taking operation the carriage is brought into its extreme right-hand position, in which the marginal holes 729 lying at the same height that is, in the same horizontal line with the line of amount-representing perforations 728, is effected on the card 489 in the manner previously described for forming the marginal line finding holes 535. The card 489 is taken out of the mechanism in the manner already described and laid aside.

Any further entries on the card 489 are effected in the same manner as the two entries previously described.

Now, if a balance, for example "200,00," the number of orders in which is less than the capacity of the column and cross footer totalizers, the paper carriage 140, which normally begins the sensing and typing of a value in the highest order of the value, must first skip from this to the highest denomination corresponding to the value to be sensed. This is effected automatically by operation of the space key 310, which must be twice actuated in the present case until the perforation on the card 489 representing the digit "2" of the value "200,00" stands opposite to the testing pin 390, after which the value sensing proper can commence.

On the arrival of the carriage with the ten-thousands or highest denomination place of column IV of the card 489 at the printing point as above described, the switch 508, 509, (Fig. 40) is operated, whereby, assuming that the number is "200,00" the following circuit is closed: from the incoming lead 532 (Fig. 25) through the switch 508, 509 to the respective stationary and traveling carriage contacts C31, C29, thence along the conductor 723 to the spring finger contacts C21, C14, C13, C7, and to the magnet 570 from which it travels to the outgoing lead 531. Energization of the magnet coil 570 effects the operation of the space key 310 in the manner hereinbefore described, and the operation is repeated until the paper carriage 140 and record medium 489 has advanced step by step to locate the perforation representing the digit "2" of the amount "200.00" opposite to the testing pin 390, corresponding to the digit "2." In the sensing operation which is thereby effected in the manner already described for other digit values, the contact C13 is opened when the contact control bar 672 (Figs. 7 and 8) for the contact group C8 to C13 is rocked from its normal position to its opposite limit of travel, so that the above-mentioned circuit is interrupted and the magnet coil 570 (Fig. 9) is de-energised. The interposed lever 554 is thereby shifted out of operative relation to the letter spacing trip lever 545 by its spring 562, in the manner already described, so that the further operation of the trip lever 545 has no effect upon the space-key 310.

*Perforating and sensing debit (negative) amounts*

In the foregoing descriptions of forming the digit-representing perforations, and the sensing thereof, the amounts used as examples, are credit items entered in columns IV and VI (Fig. 17) of the record medium 489, that is to say, the amounts constitute positive values, and while the manner of forming digit representing perforations of debit items or negative values, and the sensing of such perforations is like that already described for positive amounts, it is desirable to register such negative amounts in their appropriate column totalizers T3 and T5 and to enter the amounts in the corresponding columns III and V (Fig. 17) of the record medium.

The main difference is that the perforator carriage 319, 320 (Figs. 12–16) is latched in a different position relatively to the paper carriage 140 when the perforating and sensing instrumentalities are to function.

Thus, in its travel in letter spacing direction, the paper carriage 140 with its accompanying perforator carriage 319, 320, the negative amount columns III and V of the record medium 489, respectively are presented to the printing zone before the columns IV and VI, and the corresponding column totalizers T3 and T5, respectively, engage their master wheel 114 (Figs. 18–21), before the column totalizers T4 and T6 associated the columns IV and VI of the record medium.

Therefore, it is necessary to arrest the perforating-sensing carriage or truck 319, 320 accordingly, in dealing with negative amounts, to which end the teeth 504, 730, 722 and 731 of the rack 476 (Figs. 12–16) are spaced apart distances corresponding with the widths of the respective columns III to VI of the record medium, and when the amount to be entered and represented by perforations is negative, the latch 474 of the perforator-sensing carriage 319, 320 is engaged with the tooth 730 or 731 depending upon whether the paper carriage has advanced the record medium to bring column III or column V to the printing point. For the remainder, the punching and sensing operations are effected in the same manner as in the punching and sensing of credit entries. By means of the present mechanism, therefore, a value typed denomination by denomination on a record card by a total-taking is simultaneously and likewise automatically punched on the card denomination by denomination in order that on the succeeding registration of an entry on the card 489, the digit-representing perforations may be automatically sensed denomination by denomination and typed as an old balance in the corresponding column on the card 489. For this purpose the card 489 as mentioned, upon its insertion into the machine, must be adjusted to the first entry line 496 (Fig. 17). For locating the card 489 on the correct line for successive entries, marginal line-locating holes 535, 729 are formed in the card 489 immediately after the digit-representing perforation or perforations for the units digit of the amount has been effected. It will be noted that while such marginal line-locating holes are located in the same horizontal line with the straight one-high line of perforations representing the amount, such marginal line locating holes are a considerable distance above the printing line 496 on the record medium, which distance is determined by the distance between the printing line on the platen and the horizontal line of punches 374–377 (Fig. 5). While the marginal line locating holes 535, 729 (Fig. 17) are shown in both side margins of the record medium, the desired line on the record medium may be selected by the aid of a line locating hole in one margin only of the record medium, providing the record medium is accurately guided.

Although the present arrangement is described in conjunction with a type writing-calculating machine or the like with automatic total taking mechanism, obviously it can also be applied in type writing-calculating machines or the like in which the total taking is effected by hand by actuating the corresponding calculating keys.

We claim:

1. In a typewriting-calculating machine having a traveling paper carriage to receive a record medium; a letter spacing escapement therefor; and calculating mechanism, including a totalizer having a series of denominational wheels on which an amount is registered; of a perforator-supporting carriage mounted on, and shiftable relatively to the paper carriage; means to arrest the perforator-supporting carriage at a predetermined point intermediate the limits of travel of the paper carriage and record medium in letter spacing direction; a plurality of power-driven perforators mounted in horizontal alinement on the perforator-supporting carriage, to perforate the record medium traveling with the paper carriage relatively to the perforators, at each denominational letter spacing position of the paper carriage subsequent to the arrest of the perforator-supporting carriage and its perforators corresponding with the denominational positions of those wheels of the totalizer which register significant digits of the amount, said perforators being less in number than the number of digits from "0" to "9", and so spaced relatively to one another at distances greater than the width of a letter space as to be selectively operable according to a combinational code to form interspersed codal representations of the digits on the record medium; and selective means under control of successive denominational totalizer wheels to actuate said perforators to form representations, on the record medium corresponding only with the digits of the amount registered on the totalizer wheels.

2. In a typewriting-calculating machine having a traveling paper carriage to receive a record medium; a letter spacing escapement therefor; and calculating mechanism, including a totalizer having a series of denominational wheels on which an amount is registered; of a perforator-supporting carriage mounted on and shiftable relatively to the paper carriage; means to arrest the perforator-supporting carriage at a pedetermined point in the travel of the paper carriage and record medium in letter spacing direction; a plurality of power-driven perforators mounted in horizontal alinement on the perforator-supporting carriage, to perforate the record medium traveling with the paper carriage relatively to the perforators, at each denominational letter spacing position of the paper carriage subsequent to the arrest of the perforator-supporting carriage and its perforators corresponding with the denominational positions of those wheels of the totalizer which register significant digits of the amount, said perforators being less in number than the number of digits from "0" to "9," and so spaced relatively to one another at distances greater than the width of a letter space as to be selectively operable according to a combinational code to form interspersed codal representations of the digits on the record medium; and selective means under control of said denominational total wheels, to actuate said perforators to form a single one-high line of indications, on the record medium corresponding only with the digits of the amount registered on the totalizer wheels.

3. In a typewriting-calculating machine having a traveling paper carriage to receive a record medium; a letter spacing escapement for the paper carriage; and calculating mechanism, including a totalizer having a series of denominational wheels on which an amount is registered; of means to represent such amount in code on the record medium, including a series of code forming elements less in number than the number of digits from "0" to "9"; a supporting carriage mounted on, and shiftable relatively to, the paper carriage, the code forming elements being mounted on the supporting carriage in a single horizontal line and spaced apart a distance greater than a single letter space; means to arrest the supporting carriage at a predetermined point intermediate the limits of travel of the paper carriage and record medium in letter spacing direction; and differentially shiftable means under control of those totalizer wheels only which register the digits of an amount, to variously select one or more of the code forming elements to form representations according to a combinational code on the record medium in a single horizontal one-high line in interspersed relation as determined by the values of the respective digits of the amount and their ordinal positions in the registered amount.

4. In a typewriting-calculating machine having a traveling paper carriage to carry a record medium; a letter spacing escapement for the paper carriage; calculating mechanism, including a tatalizer having a series of denominational wheels on which an amount is registered; and means to reset the wheels one by one to zero as the paper carriage escapes step by step; of a perforator-supporting carriage mounted on and shiftable relatively to the paper carriage; means to arrest the perforator-supporting carriage at a predetermined point in the letter-spacing travel of the paper carriage and its record medium, and short of the end of such travel; code forming elements less in number than the number of digits from "0" to "9" mounted on said perforator-supporting carriage, in spaced relation greater than a single letter space, to perforate the record medium to form a digit-representing combinational code; magnets to drive the perforators on their perforating strokes; electric circuits for the respective magnets terminating in spaced contact fingers; and means controlled by said zero-resetting means, including a differentially adjustable contact carrier, and contacts arranged in predetermined relation in a number of rows corresponding with the number of contact fingers, said carrier being shiftable relatively to the contact fingers in consonance with the digital positions of the totalizer wheels, to selectively complete one or more of the electric circuits for energizing the driving magnets of the perforators upon the zero setting of each successive totalizer wheel.

5. In a typewriting-calculating machine having a traveling paper carriage to carry a record medium; a letter spacing escapement for the paper carriage; and calculating mechanism, including a totalizer having a series of denominational wheels on which an amount is registered; of a perforator-supporting carriage mounted on and shiftable relatively to the paper carriage; means to arrest the perforator-supporting carriage at a predetermined point in the travel of the paper carriage and its record medium in letter spacing direction: a plurality of power-driven perforators less in number than the number of digits from "0" to "9" mounted on the supporting carriage in spaced relation and in horizontal alinement to perforate the record medium to form a digit-representing combinational code as the medium is advanced in letter spacing direction by the paper carriage relatively to the arrested perforator-supporting carriage and its perforators: and means controlled by the totalizer wheels successively to selectively effect operation of the perforators to form digit representations on the record representative of the digits of the amount registered on the totalizer wheels, in a single straight one-high line, the indications being relatively interspersed according to the values and ordinal positions of such digits, the individual perforations being of less width than the width of a letter space.

6. In a typewriting-calculating machine having a traveling paper carriage to carry a record medium; a letter spacing escapement for the paper carriage; and calculating mechanism, including a totalizer having a series of denominational wheels on which an amount is registered; of a perforator-supporting carriage mounted on and shiftable relatively to the paper carriage; means to arrest the perforator-supporting carriage at a predetermined point in the travel of the paper carriage and its record medium in letter spacing direction: a plurality of power-driven perforators less in number than the number of digits from "0" to "9", mounted on the perforator-supporting carriage in a horizontal line and spaced apart from each other a distance greater in length than the space occupied by the number of totalizer wheels in the totalizer, to perforate the record medium to form a digit-representing combinational code, as the medium is advanced in letter-spacing direction by the paper carriage relatively to the arrested perforator-supporting carriage and its perforators; and means controlled by the totalizer wheels successively, to selectively effect operation of the perforators to form digit representations on the record medium in one or more letter space positions at a time, of the digits of the amount registered on the totalizer wheels in a single straight one-high line, the digit representations being relatively interspersed according to the values and ordinal positions of such digits, and where any digit is represented by more than one perforation, such perforations being spaced apart a distance greater than a number of letter spaces corresponding to the number of totalizer wheels.

7. In a typewriting-calculating machine having a traveling paper carriage to carry a record medium; a letter spacing escapement for the paper carriage; and calculating mechanism, including a totalizer having a series of denominational wheels on which an amount is registered; of a perforator-supporting carriage mounted on and shiftable relatively to the paper carriage; means to arrest the perforator-supporting carriage at a predetermined point in the travel of the paper carriage and its record medium in letter spacing direction: a plurality of power-driven perforators less in number than the number of digits from "0" to "9," mounted on the perforator-supporting carriage in a horizontal line and spaced apart from each other a distance, greater in length than the space occupied by the number of totalizer wheels in the totalizer, to perforate the record medium to form a digit-representing combinational code, as the medium is advanced in letter-spacing direction by the paper carriage relatively to the arrested perforator-supporting carriage and its perforators; and means controlled by the totalizer wheels successively, to selectively effect operation of the perforators to form digit representations on the record medium of the digits of the amount registered on the totalizer wheels, in a single straight one-high line, of greater length than the combined widths of a number of letter spaces corresponding to the number of denominational wheels in the totalizer, to enable relative interspersion of the digit representations according to the values and ordinal positions of the digits in the amount.

8. In a typewriting-calculating machine having a traveling paper carriage to carry a record medium; a letter spacing escapement for the paper carriage; and calculating mechanism, including a totalizer having a series of denominational wheels on which an amount is registered; of a perforator-supporting carriage mounted on the paper carriage, the two carriages being relatively shiftable; means to arrest the perforator-supporting carriage at a predetermined point intermediate the limits of travel of the paper carriage and record medium in letter spacing direction; a plurality of power-driven perforators less in number than the number of digits from "0" to "9," and mounted in a single line on the perforator-supporting carriage to form a digit-representing combinational code on the record medium traveling with the paper carriage; means to restore the totalizer wheels to zero one by one; and differentially shiftable means operable by said zero resetting means under control of those totalizer wheels representing the amount, to selectively effect, incident to the restoration of each such totalizer wheel, the operation of one or more of the perforators to perforate the record medium with a single, horizontal, one-high row of interspersed perforations representing the digits of the amount registered on the totalizer, the relative positions in such horizontal row of the perforations representing the digits of the amount, being determined by the values of the digits and their ordinal positions.

9. In a typewriting-calculating machine having a traveling paper carriage to carry a record medium; a letter-spacing escapement for the paper carriage; and calculating mechanism, including a totalizer having a series of denominational wheels on which an amount is registered; of a perforator-supporting carriage mounted on and shiftable relatively to the paper carriage; means to arrest the perforator-supporting carriage at a predetermined point intermediate the limits of travel of the paper carriage and record medium in letter spacing direction; additional means to arrest the perforator-supporting carriage at a predetermined point in the return of the paper carriage and the record medium; a plurality of power-driven perforators less in number than the number of digits from "0" to "9," and mounted on the supporting carriage in horizontal alinement to form a digit-representing combinational code on the record medium traveling with the paper carriage subsequent to the arrest of the perforator-supporting carriage during the travel of the paper carriage and record medium in letter spacing direction; means controlled by the totalizer wheels to selectively effect operation of the perforators to form digit-representations on the record medium of the digits of the amount registered on the totalizer wheels; a punch mounted on the perforator-supporting carriage in the same horizontal line with the perforators to cooperate with one of said perforators to form line locating holes in the marginal side edges of the record medium; and means manually operable, subsequent to the arrest of the perforator-supporting carriage on the return travel of the paper carriage and its record medium, to effect the actuation of said punch and said one of the perforators to form said line locating holes outside the zone of digit-representing perforations.

10. In a typewriting calculating machine having a traveling carriage to carry a record medium; a letter spacing escapement for the paper carriage; and calculating mechanism, including a totalizer having a series of denominational totalizer wheels on which an amount is registered; of a supporting carriage mounted on the paper carriage, the two carriages being relatively shiftable; means to retain the supporting carriage at a predetermined point intermediate the limits of travel of the paper carriage and record medium in letter spacing direction; a plurality of selectively operable power-driven code forming elements mounted in a single straight line on the supporting carriage, to form code representations on the record medium during farther travel of the record medium and paper carriage relatively to the supporting carriage in letter spacing direction, said elements being less in number than the number of digits from "1" to "9," and relatively so spaced and distributed in the direction of feed of the carriage through a distance materially greater than a single carriage step that, with reference to a succession of codal representations on the record medium, the code representation of one digit of the amount may be interspersed in relation to the codal representation of another digit; and means controlled by those totalizer wheels representing the registered amount, to selectively effect the operation of one or more of the code forming elements according to a combination code representing the digits of such amount, one by one on the record medium in a single straight line of code representations variably interspersed relatively to one another according to the value of the digit and its ordinal position in the amount to be coded.

11. In a typewriting calculating machine having a traveling paper carriage to carry a record medium; a letter-spacing escapement for the paper carriage; and calculating mechanism, including a totalizer having a series of denominational wheels on which an amount is registered; of a supporting carriage mounted on the paper carriage, the two carriages being relatively shiftable; means to arrest the supporting carriage at a predetermined point intermediate the limits of travel of the paper carriage and record medium; a plurality of selectively operable code-forming elements mounted on the supporting carriage, less in number than the number of digits from "0" to "9," and so spaced on the supporting carriage through a distance greater than the number of totalizer wheels in the totalizer, as to form interspersed code representations on the record medium, of the digits registered on the totalizer during the farther travel in letter spacing direction of the paper carriage and record medium relatively to the arrested supporting carriage and code-forming elements; and means controlled by those totalizer wheels on which the digits of the amount are registered, to selectively determine the operation of the code-forming elements singly or in pairs, to form one by one, on the record medium, codal representations of the digits of such amount, according to a combinational code, in a single straight line one-high, the code representations of successive codal representations of successive digits of the amount registered on the totalizer being interspersed irrespective of the ordinal positions of said digits in said amount.

ERICH MEZ.
FRIEDRICH POTT.
WERNER HEINZE.